United States Patent
Lei et al.

(10) Patent No.: US 11,057,175 B2
(45) Date of Patent: *Jul. 6, 2021

(54) SYNCHRONIZATION SIGNALS FOR NARROWBAND OPERATION

(71) Applicant: QUALCOMM Incorporated, San Diego, CA (US)

(72) Inventors: Jing Lei, San Diego, CA (US); Peter Gaal, San Diego, CA (US); Hao Xu, Beijing (CN); Wanshi Chen, San Diego, CA (US); Yongbin Wei, La Jolla, CA (US); Xiao Feng Wang, San Diego, CA (US); Renqiu Wang, San Diego, CA (US); Seyed Ali Akbar Fakoorian, San Diego, CA (US); Madhavan Srinivasan Vajapeyam, San Diego, CA (US); Alberto Rico Alvarino, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,941

(22) Filed: Jan. 28, 2019

(65) Prior Publication Data
US 2019/0165911 A1 May 30, 2019

Related U.S. Application Data

(63) Continuation of application No. 15/247,355, filed on Aug. 25, 2016, now Pat. No. 10,256,955.
(Continued)

(51) Int. Cl.
*H04W 72/04* (2009.01)
*H04L 5/00* (2006.01)
(Continued)

(52) U.S. Cl.
CPC ........ *H04L 5/0048* (2013.01); *H04J 11/0069* (2013.01); *H04L 5/0044* (2013.01);
(Continued)

(58) Field of Classification Search
CPC . H04L 5/0048; H04L 27/2663; H04L 27/266; H04L 27/2613; H04L 27/2602;
(Continued)

(56) References Cited

U.S. PATENT DOCUMENTS 9,277,519 B1   3/2016   Pu et al.
9,510,212 B2   11/2016  Xu et al.
(Continued)

FOREIGN PATENT DOCUMENTS

CN   102123414 A   7/2011
CO     7290151 A1  6/2015
(Continued)

OTHER PUBLICATIONS

Kristo et al, Analysis of the Frequency Offset Effect on Zadoff-Chu Sequence Timing, 2013.*
(Continued)

*Primary Examiner* — Jay P Patel

(57) ABSTRACT

Aspects of the present disclosure provide techniques for design of synchronization signals for narrowband operation, which can be used for stand-alone/in-band/guard-band deployment. An example method is provided for operations which may be performed by a base station (BS). The example method generally includes generating a primary synchronization signal (PSS) utilizing a first code sequence and a cover code applied to the first code sequence over a first number of symbols within one or more subframes, generating a secondary synchronization signal (SSS) based on a second code sequence over a second number of symbols within one or more subframes, and transmitting the PSS and
(Continued)

the SSS in the first and second subframes to a first type of a user equipment (UE) that communicates on one or more narrowband regions of wider system bandwidth.

34 Claims, 18 Drawing Sheets

Related U.S. Application Data

(60) Provisional application No. 62/234,554, filed on Sep. 29, 2015.

(51) Int. Cl.
*H04J 11/00* (2006.01)
*H04L 27/26* (2006.01)
*H04W 56/00* (2009.01)

(52) U.S. Cl.
CPC ........ *H04L 27/2602* (2013.01); *H04L 27/266* (2013.01); *H04L 27/2613* (2013.01); *H04L 27/2655* (2013.01); *H04L 27/2663* (2013.01); *H04W 56/001* (2013.01); *H04W 56/0015* (2013.01); *H04W 72/0446* (2013.01); *H04L 27/2671* (2013.01); *H04L 27/2675* (2013.01); *H04L 27/2692* (2013.01)

(58) Field of Classification Search
CPC ............... H04L 5/0044; H04L 27/2655; H04L 27/2692; H04L 27/2675; H04L 27/2671; H04W 72/0446; H04W 56/001; H04W 56/0015; H04J 11/0069; H04J 2211/005
See application file for complete search history.

(56) References Cited

U.S. PATENT DOCUMENTS

| | | | |
|---|---|---|---|
| 9,693,326 B2 | 6/2017 | Lorca et al. | |
| 10,206,189 B2 | 2/2019 | Lin et al. | |
| 10,601,627 B2* | 3/2020 | Yi | H04W 48/16 |
| 2008/0151967 A1 | 6/2008 | Fullerton et al. | |
| 2008/0214157 A1* | 9/2008 | Ramer | G06Q 10/00 |
| | | | 455/414.1 |
| 2009/0001176 A1 | 1/2009 | Peynet et al. | |
| 2009/0011761 A1 | 1/2009 | Han et al. | |
| 2009/0110033 A1 | 4/2009 | Shattil | |
| 2011/0027410 A1 | 2/2011 | Mohammed et al. | |
| 2011/0274102 A1 | 11/2011 | Kim et al. | |
| 2012/0071103 A1 | 3/2012 | Kadous et al. | |
| 2014/0241222 A1 | 8/2014 | Yang et al. | |
| 2014/0301353 A1 | 10/2014 | Frenne et al. | |
| 2014/0321450 A1 | 10/2014 | Zhang et al. | |
| 2015/0195787 A1 | 7/2015 | Webb et al. | |
| 2015/0245308 A1 | 8/2015 | Lorca et al. | |
| 2015/0304080 A1 | 10/2015 | Yi et al. | |
| 2015/0373668 A1 | 12/2015 | Lee et al. | |
| 2016/0043848 A1 | 2/2016 | Kim | |
| 2016/0182201 A1 | 6/2016 | Jiang et al. | |
| 2016/0204920 A1 | 7/2016 | Benjebbour et al. | |
| 2016/0227495 A1* | 8/2016 | Lee | H04W 56/00 |
| 2016/0262123 A1 | 9/2016 | Abedini et al. | |
| 2016/0270015 A1 | 9/2016 | Lin et al. | |
| 2016/0337105 A1 | 11/2016 | Lawton et al. | |
| 2016/0374080 A1* | 12/2016 | Wei | H04W 72/0413 |
| 2017/0041894 A1 | 2/2017 | Lee et al. | |
| 2017/0070968 A1 | 3/2017 | Kim et al. | |
| 2017/0093540 A1 | 3/2017 | Lei et al. | |
| 2017/0201420 A1 | 7/2017 | Chen et al. | |
| 2017/0223648 A1* | 8/2017 | Shin | H04W 56/005 |
| 2017/0237463 A1 | 8/2017 | Zheng et al. | |
| 2018/0184390 A1 | 6/2018 | Wu et al. | |
| 2018/0192355 A1* | 7/2018 | Kim | H04J 11/00 |
| 2018/0249433 A1 | 8/2018 | Shin et al. | |
| 2018/0278355 A1 | 9/2018 | Shin et al. | |
| 2018/0316464 A1* | 11/2018 | Stern-Berkowitz | ............... |
| | | | H04L 1/0034 |
| 2019/0044690 A1* | 2/2019 | Yi | H04L 12/189 |
| 2019/0150109 A1 | 5/2019 | Lin et al. | |
| 2019/0165911 A1 | 5/2019 | Lei et al. | |
| 2019/0182002 A1 | 6/2019 | Lei et al. | |

FOREIGN PATENT DOCUMENTS

| | | | |
|---|---|---|---|
| EP | 2333970 | A1 | 6/2011 |
| EP | 2681946 | A1 | 1/2014 |
| JP | S63252050 | A | 10/1988 |
| JP | H09200180 | A | 7/1997 |
| JP | 2002252865 | A | 9/2002 |
| JP | 2009530984 | A | 8/2009 |
| JP | 2012517187 | A | 7/2012 |
| KR | 20110122839 | A | 11/2011 |
| RU | 2562827 | C2 | 9/2015 |
| WO | 2012027880 | A1 | 3/2012 |
| WO | 2013163498 | A2 | 10/2013 |

OTHER PUBLICATIONS

NB LTE—Concept Description L1; Sep. 2015.*
Small cell discovery enhancement; Feb. 2014.*
Ericsson., et al., "NB LTE—Concept Description L1," 3GPP Draft; RP-151397—NB-LTE—Concept Description L1, 3rd Generation Partnership Project (3GPP), Mobile Competence Centre ; 650, Route Des Lucioles ; F-06921 Sophia-Cedex ; France vol. TSG RAN, No. Phoenix, Arizona, USA; Sep. 14, 2015-Sep. 16, 2015 Sep. 8, 2015 (Sep. 8, 2015), XP051039282, Retrieved from the Internet: URL:http://www.3gpp.org/ftp/Meetings_3GPP_SYNC/RAN/Docs/ [retrieved on Sep. 8, 2015], 24 pages.
Ericsson LM., et al., "Narrowband LTE—Concept Description," 3GPP Draft; R1-154659, 3rd Generation Partnership Project (3GPP), Mobile Competence Centre ; 650, Route Des Lucioles ; F-06921 Sophia-Antipolis Cedex ; France vol. RAN WG1, No. Beijing, China; Aug. 24, 2015-Aug. 28, 2015 Aug. 23, 2015 (Aug. 23, 2015), XP051001893, Retrieved from the Internet: URL:http://www.3gpp.org/ftp/Meetings_3GPP_SYNC/RAN1/Docs/ [retrieved on Aug. 23, 2015], 9 pages.
International Preliminary Report on Patentability—PCT/US2016/048973, The International Bureau of WIPO—Geneva, Switzerland, dated Apr. 12, 2018.
International Search Report and Written Opinion—PCT/US2016/048973—ISA/EPO—dated Feb. 1, 2017.
Nec: "Small Cell Discovery Enhancement," 3GPP Draft; R1-140418, 3rd Generation Partnership Project (3GPP), Mobile Competence Centre ; 650, Route Des Lucioles ; F-06921 Sophia-Antipolis Cedex ; France vol. Ran WG1, No. Prague, Czech Republic; Feb. 14, 2014-Feb. 14, 2014 Feb. 9, 2014 (Feb. 9, 2014), XP050735961, Retrieved from the Internet: URL:http://www.3gpp.org/ftp/Meetings_3GPP_SYNC/RAN/RAN1/Docs/ [retrieved on Feb. 9, 2014], 4 pages.
Partial International Search Report—PCT/US2016/048973—ISA/EPO—dated Nov. 9, 2016.
Silva C. E. M., et al., "Cell Search in Long Term Evolution systems: Primary and Secondary Synchronization", circuits and Systems (LASCAS), 2012, IEEE Third Latin American Symposium on IEEE, Feb. 29, 2012, KP032163022, pp. 1-4.
European Search Report—EP20161555—Search Authority—Munich—dated Jun. 26, 2020.
Taiwan Search Report—TW105127594—TIPO—dated Nov. 10, 2019.
Taiwan Search Report—TW109104803 13 TIPO—dated Feb. 4, 2021.

* cited by examiner

900

Reduced Alphabet Given by $\{e^{j\pi\beta/6}\}$ for K = 12

| $\alpha$ | $\beta$ | | | | | |
|---|---|---|---|---|---|---|
| 1 | 0 | 2 | 4 | 6 | 8 | -- |
| 5 | 0 | 2 | 4 | 6 | 10 | -- |
| 7 | 0 | 2 | 3 | 6 | 7 | 8 |
| 1 | 0 | 1 | 4 | 5 | 6 | 10 |

*FIG. 9*

| Symbol Index | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| PN Cover | | | | | 1 | 1 | 1 | -1 | -1 | -1 | 1 | -1 | -1 | 1 | -1 |
| Sub-Vector of PSS Samples | | | | | $\gamma_1$ | $\gamma_2$ | $\gamma_3$ | $\gamma_4$ | $\gamma_5$ | $\gamma_6$ | $\gamma_7$ | $\gamma_8$ | $\gamma_9$ | $\gamma_{10}$ | $\gamma_{11}$ |

| SSS Symbol Index | 1 | 2 | 3 | ... | M | PAYLOAD |
|---|---|---|---|---|---|---|
| Roots Arrangement #1 | μ(1,1) | μ(1,2) | μ(1,3) | ... | μ(1,M) | Cell ID |
| Roots Arrangement #2 | μ(2,1) | μ(2,2) | μ(2,3) | ... | μ(2,M) | Cell ID |
| Roots Arrangement #3 | μ(3,1) | μ(3,2) | μ(3,3) | ... | μ(3,M) | Cell ID |
| | | ••• | | | | Subframe Nubmer |
| | | ••• | | | | Sys Info |

SYNCHRONIZATION SIGNALS FOR NARROWBAND OPERATION

CROSS-REFERENCE TO RELATED APPLICATIONS & PRIORITY CLAIM

The present Application for Patent is a continuation of U.S. Non-Provisional application Ser. No. 15/247,355, filed Aug. 25, 2016, which claims priority to U.S. Provisional Patent Application No. 62/234,554, filed Sep. 29, 2015, each of which is assigned to the assignee of the present application and hereby expressly incorporated by reference herein in its entirety.

BACKGROUND

Field of the Disclosure

Certain aspects of the present disclosure generally relate to wireless communications and, more particularly, to design of synchronization signals for narrowband operation.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

Certain aspects of the present disclosure provide a method for wireless communications by a base station. The method generally includes generating a primary synchronization signal (PSS) utilizing a first code sequence and a cover code applied to the first code sequence over a first number of symbols within one or more subframes, generating a secondary synchronization signal (SSS) based on a second code sequence over a second number of symbols within one or more subframes, and transmitting the PSS and the SSS to a first type of a user equipment (UE) that communicates on one or more narrowband regions of wider system bandwidth.

Certain aspects of the present disclosure provide a method for wireless communications by a user equipment. The method generally includes detecting, within one or more narrowband regions of wider system bandwidth, a primary synchronization signal (PSS) generated utilizing a first code sequence and a cover code applied to the first code sequence over a first number of symbols within one or more subframes, performing a maximum-likelihood time offset estimation based on the PSS, wherein the time offset is uncorrelated with a frequency offset, performing an initial time synchronization and a frequency synchronization based on the PSS, detecting, within the one or more narrowband regions, a secondary synchronization signal (SSS) generated based on a second code sequence over a second number of symbols within the one or more subframes, and performing at least one of fine time synchronization or fine frequency synchronization based on the SSS, to refine the initial time and frequency synchronization.

Numerous other aspects are provided including methods, apparatus, systems, computer program products, and processing systems.

BRIEF DESCRIPTION OF THE DRAWINGS

FIG. 9 illustrates an example of a modified Zadoff-Chu Sequences with reduced alphabet size, in accordance with certain aspects of the present disclosure.

FIG. 16A is a graph illustrating the constellation of PSS sequence corresponding to a Modified Zadoff-Chu Sequence of length 12, in accordance with certain aspects of the present disclosure.

DETAILED DESCRIPTION

Certain aspects of the present disclosure generally relate to design of synchronization signals for narrowband operation. Designs presented herein may be suitable for various narrowband deployment scenarios, such as both in-band (within wider operating bandwidth) and stand-alone deployments. As will be described herein, in some cases, a "two-tiered" PSS signal may be constructed, for example, using dual-layer random codes with good correlation and run length properties.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Example Wireless Communication System

Figure 1:
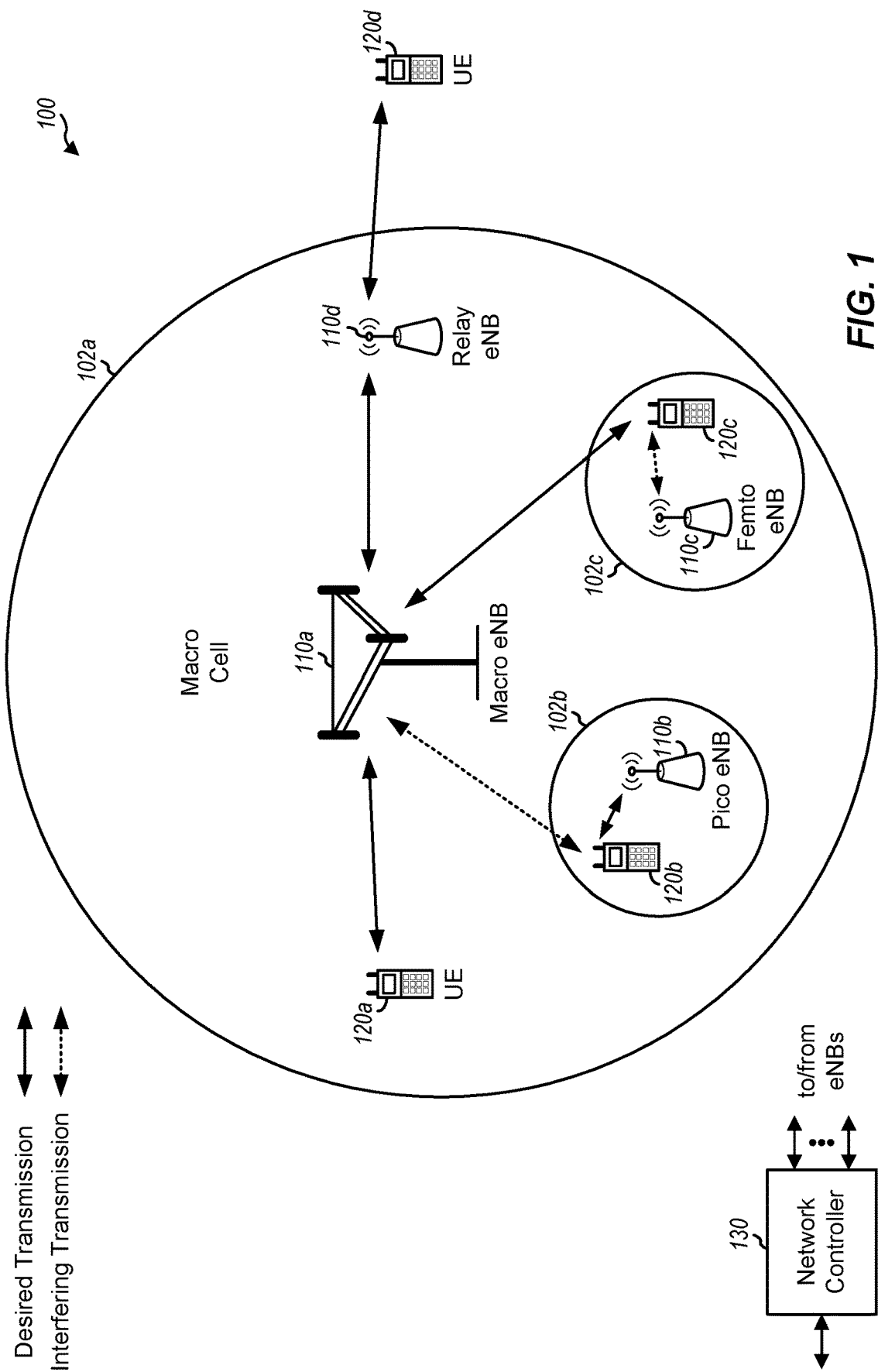
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

According to certain aspects, narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
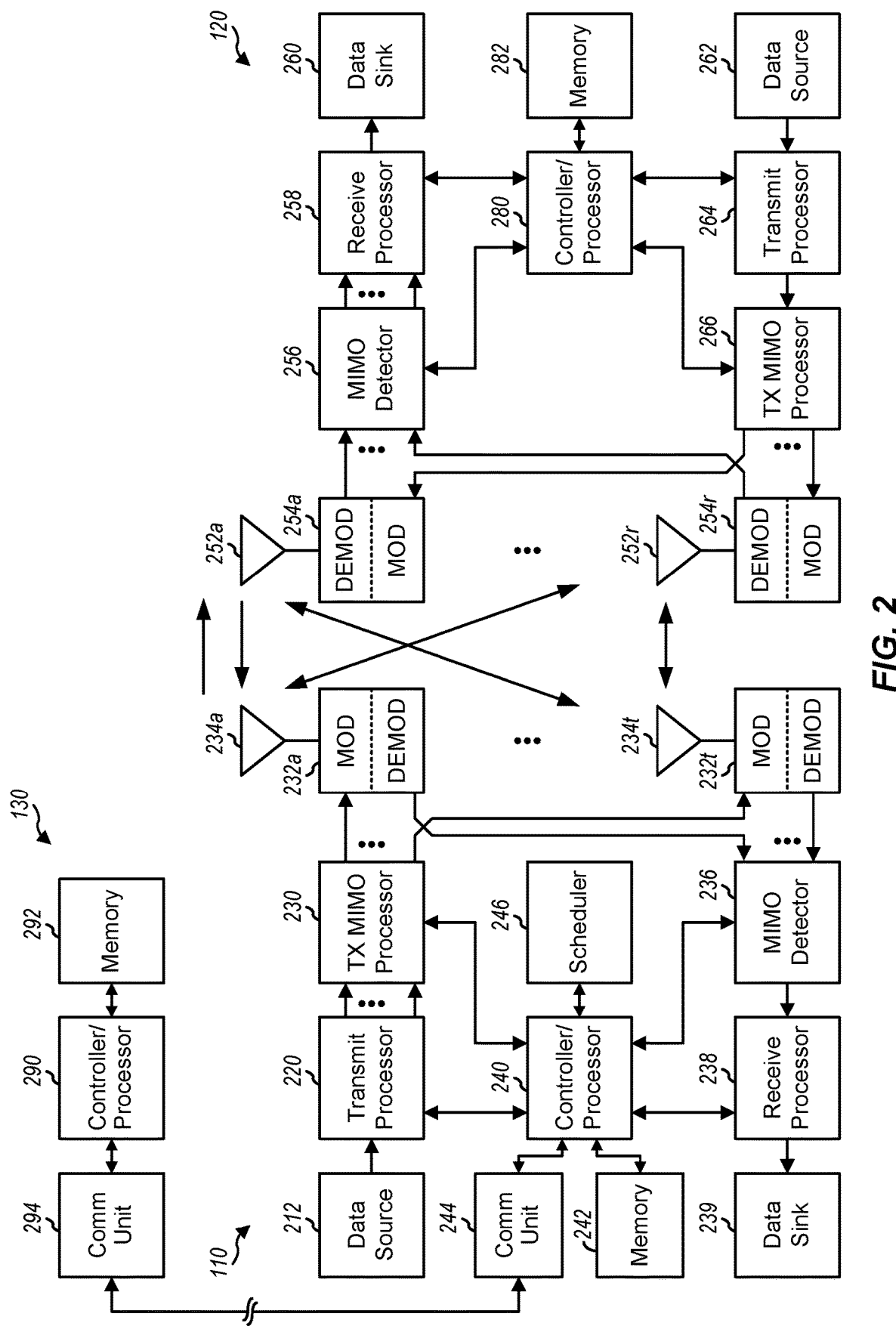
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 280 and/or other processors and modules at UE 120, may perform or direct operations 600 shown in FIG. 6. Memories 242 and 282 may store data and program codes for base station 110 and UE 120, respectively. A scheduler 246 may schedule UEs for data transmission on the downlink and/or uplink.

Figure 3:
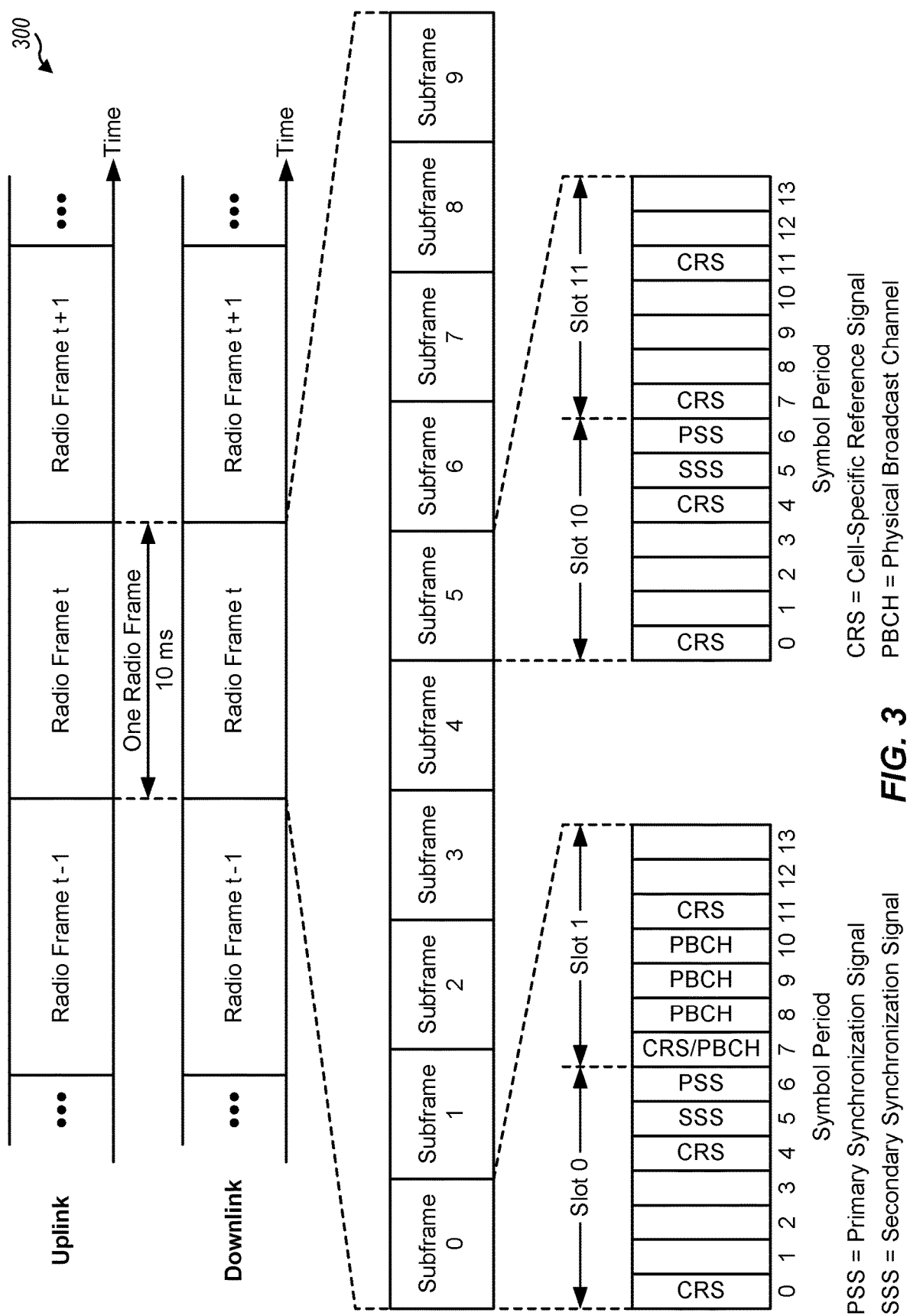
FIG. 3 shows an exemplary frame structure for frequency division duplexing (FDD) in long term evolution (LTE).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode (e.g., with PSS and SSS used in determining the cell ID). The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells. Measurements for non-serving neighbor cells may be made based on a different schedule than for serving cells and the UE may need to tune away from the serving cell to measure non-serving cells when the UE is in connected mode.

To facilitate channel quality measurements, n eNB may transmit a cell specific reference signal (CRS) on specific subframes. For example, an eNB may transmit CRS over subframes 0 and 5 for a given frame. A narrowband UE may receive this signal and measure the average power of the received signal, or RSRP. The narrowband UE may also calculate a Receive Signal Strength Indicator (RSSI) based on the total received signal power from all sources. A RSRQ may be also be calculated based on the RSRP and RSSI.

To facilitate measurements, an eNB may provide a measurement configuration to UEs in its coverage area. The measurement configuration may define event triggers for measurement reporting and each event trigger may have associated parameters. When the UE detects a configured measurement event, it may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter can be used to define how long a measurement event must persist before the UE sends its measurement report. In this way, the UE can signal changes in its radio conditions to the network.

Figure 4:
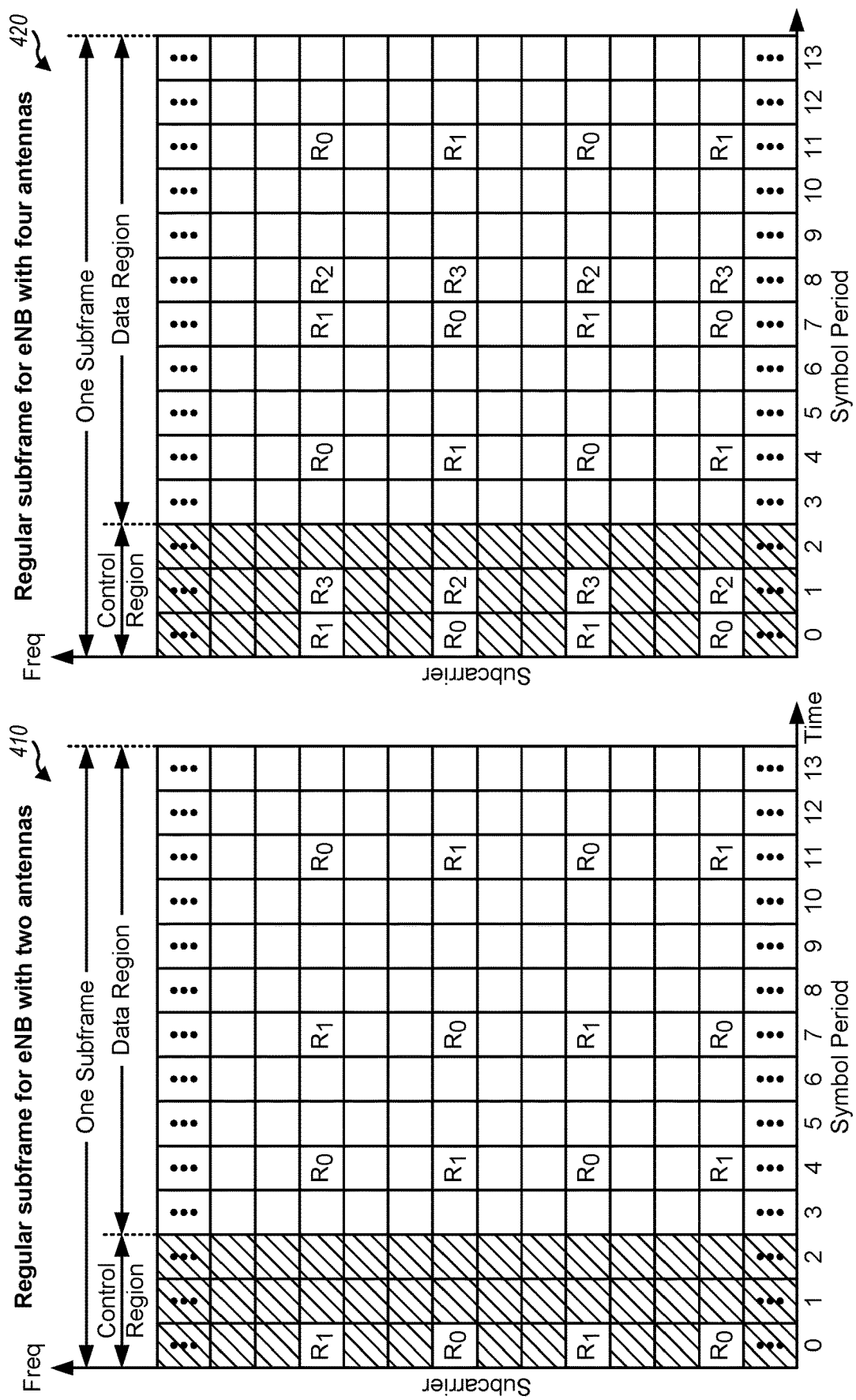
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID or identification). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

The focus of traditional LTE design is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

Thus, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, narrowband UEs may have a relaxed switching time to transition from transmitting to receiving (or receiving to transmitting). For example, the switching time may be relaxed from 20 μs for regular UEs to 1 ms for narrowband UEs. Release 12 narrowband UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the narrowband may be limited to a particular narrowband assignment (e.g., of no more than six resource blocks (RBs)) within the available system bandwidth. However, the narrowband may be able to re-tune (e.g., operate and/or camp) to different narrowband regions within the available system bandwidth of the LTE system, for example, in order to co-exist within the LTE system.

As another example of coexistence within the LTE system, narrowband UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the narrowband UEs may be able to receive the legacy PBCH with one or more additional repetitions of the PBCH across multiple subframes. As another example, the narrowband UEs may be able to transmit one or more repetitions of PRACH (e.g., with one or more PRACH formats supported) to an eNB in the LTE system. The PRACH may be used to identify the narrowband UE. Also, the number of repeated PRACH attempts may be configured by the eNB.

The narrowband UE may also be a link budget limited device and may operate in different modes of operation (e.g. entailing different amounts of repeated messages transmitted to the narrowband UE) based on its link budget limitation. For example, in some cases, the narrowband UE may operate in a normal coverage mode in which there is little to no repetition (i.e., the amount of repetition needed for the UE to successfully receive a message may be low or repetition may not even be needed). Alternatively, in some cases, the narrowband UE may operate in a coverage enhancement (CE) mode in which there may be high amounts of repetition. For example, for a 328 bit payload, a narrowband UE in CE mode may need 150 or more repetitions of the payload in order to successfully receive the payload.

In some cases, for example, for LTE Rel-13, the narrowband UE may have limited capabilities with respect to its reception of broadcast and unicast transmissions. For example, the maximum transport block (TB) size for a broadcast transmission received by the narrowband UE may be limited to 1000 bits. Additionally, in some cases, the narrowband UE may not be able to receive more than one unicast TB in a subframe. In some cases (e.g., for both the CE mode and normal mode described above), the narrowband UE may not be able to receive more than one broadcast TB in a subframe. Further, in some cases, the narrowband UE may not be able to receive both a unicast TB and a broadcast TB in a subframe.

Narrowband UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-narrowband UEs. For example, as compared to conventional paging messages used in LTE, narrowband UEs may able to monitor and/or receive paging messages that non-narrowband UEs may not able to monitor and/or receive. Similarly, as compared to conventional random access response (RAR) messages used in a conventional random access procedure, narrowband UEs may be able to receive RAR messages that also may not be able to be received by non-narrowband UEs. The new paging and RAR messages associated with narrowband UEs may also be repeated one or more times (e.g., "bundled"). In addition, different numbers of repetitions (e.g., different bundling sizes) for the new messages may be supported.

According to certain aspects, multiple narrowband regions, with each narrowband region spanning a bandwidth that is no greater than a total of 6 RBs, may be supported by narrowband UE and/or narrowband operation. In some cases, each narrowband UE in narrowband operation may operate within one narrowband region (e.g., at 1.4 MHz or 6 RBs) at a time. However, narrowband UEs in narrowband operation, at any given time, may re-tune to other narrowband regions in the wider system bandwidth. In some examples, multiple narrowband UEs may be served by the same narrowband region. In other examples, multiple narrowband UEs may be served by different narrowband regions (e.g., with each narrowband region spanning 6 RBs). In yet other examples, different combinations of narrowband UEs may be served by one or more same narrowband regions and/or one or more different narrowband regions.

Some systems, for example, in LTE Rel-13, introduce coverage enhancements and support for narrowband UEs, as well as other UEs. As used herein, the term coverage enhancement generally refers to any type of mechanism that extends the coverage range of a device (such as a narrowband device) within a network. One approach for coverage enhancement (CE) is bundling which refers to transmitting the same data multiple times (e.g., across multiple subframes or, as will be described in greater detail below, across multiple symbols within a same subframe).

In certain systems, narrowband UEs may support narrowband operation while operating in a wider system bandwidth. For example, a narrowband UE may transmit and receive in a narrowband region of a system bandwidth. As noted above, the narrowband region may span 6 resource blocks (RBs).

Certain systems may provide narrowband UEs with coverage enhancements of up to 15 dB, which maps to 155.7 dB maximum coupling loss between the UE and an eNB. Accordingly, narrowband UEs and eNB may perform measurements at low SNRs (e.g., −15 dB to −20 dB). In some systems, coverage enhancements may include channel bundling, wherein messages associated with narrowband UEs may be repeated (e.g., bundled) one or more times.

Certain devices may be able to communicate both with legacy type communications and non-legacy type communications. For example, some devices may be able to communicating in both narrowband regions (of overall system bandwidth) as well as wider band regions. While the examples above refer to low cost or MTC devices that communicate via narrowband regions, other (non-low-cost/non-MTC) types of devices may also communicate vie narrowband regions, for example, taking advantage of frequency selectivity and directional transmissions.

Example Design of Synchronization Signals for Narrowband Operation

Certain aspects of the present discourse provide design of synchronization signals, which may be detected by devices that communicate using relative narrowband regions of system bandwidth, such as narrowband internet of things (NB-IoT) devices. As noted above, designs presented herein may utilize a two-tiered approach to generate a PSS signal with good correlation and run length properties that may be suitable for both in-band and stand-alone deployments.

Such synchronization signals may include PSS used for frequency and timing synchronization and SSS to convey system information. According certain aspects of the present disclosure, synchronization signals of narrowband internet of things (NB-IoT) operations occupy narrow channel bandwidths and can coexist with legacy GSM/WCDMA/LTE system(s) deployed in the same frequency band. In one aspect of the present disclosure, the NB-IoT synchronization signals utilize only one Physical Resource Block (PRB).

According to certain aspects of the present disclosure, narrowband devices may supports very low throughput machine to machine (M2M) communications in low-end machine type communications (MTC) market, and it can provide power efficiency. For example, the battery life for some devices may have a target of up to ten years (e.g., for a battery capacity of five watt-hours). It is conceivable that a large number of NB-IoT devices may be deployed and may provide reliable indoor coverage of up to 20 dB coverage extension relative to legacy GPRS. Such devices may also be able to operate in challenging deployments, such as ground floor and basement deployments. Such devices may have reduced complexity (and cost) as they may not need to support circuit switched services and may not need to support Inter-Radio Access Technology (IRAT) mobility.

According to certain aspects of the present disclosure, in-band deployments of NB-IoT devices may be in compliance with legacy LTE numerology (as in compatible tone spacing and bandwidth). As will be described in greater detail below, resource allocation can be collision-free between NB-IoT and legacy LTE DL physical signals, such as cell-specific reference signals (CRS), synchronization signals, and control channel.

According to certain aspects, the PSS/SSS scheme presented herein may allow UEs to perform both fractional and integer carrier frequency offsets even in deployments with frequency offset up to 20 ppm (e.g., approximately 18 KHz to a 900 MHz Global System for Mobile (GSM)) for initial DL synchronization. Because 18 KHz is greater than 15 KHz (NB-IoT subcarrier spacing), the NB-IoT devices are required to handle frequency offset greater than one subcarrier-spacing.

In some cases (e.g., with an ever increasing number of deployed IoT devices and the dominance of UL traffic, the synchronization signals are required to carry more system information, such as more cell IDs, relative to conventional synchronization signals (e.g., PSS/SSS of legacy LTE devices). In large scale deployments, NB synchronization signals may use more bits allocated for signaling of system information than legacy LTE, for example, to signal a subframe index indication, in-band/standalone/guard-band deployment mode, and frequency-division duplexed (FDD)/time-division duplexed (TDD) multiplexing code.

PSS/SSS designs presented herein may be suitable for stand-alone/in-band/guard-band deployments, and the design can be extended to other LTE-based MTC deployments using more than one physical resource block (PRB). For example, synchronization signals subcarrier spacing can be 15 KHz and may be fully aligned with OFDM symbol boundaries of legacy LTE. In some cases, NB-IoT synchronization signals can utilize resource elements unoccupied by legacy LTE DL physical signals and control channels, and the utilization of unoccupied resource elements can resolve resource segmentation and interference problems. Such signal design may allow for the co-existence of narrow-band and wide-band LTE systems within legacy LTE operation.

For some cases of extreme coverage situations, a minimum coupling loss (MCL) of 164 dB may be needed. A design may have high power efficiency, support a large number of devices, and be implemented at a low cost. In some cases, a 180 kHz channel bandwidth may be used for communications by narrowband UEs.

Figure 5:
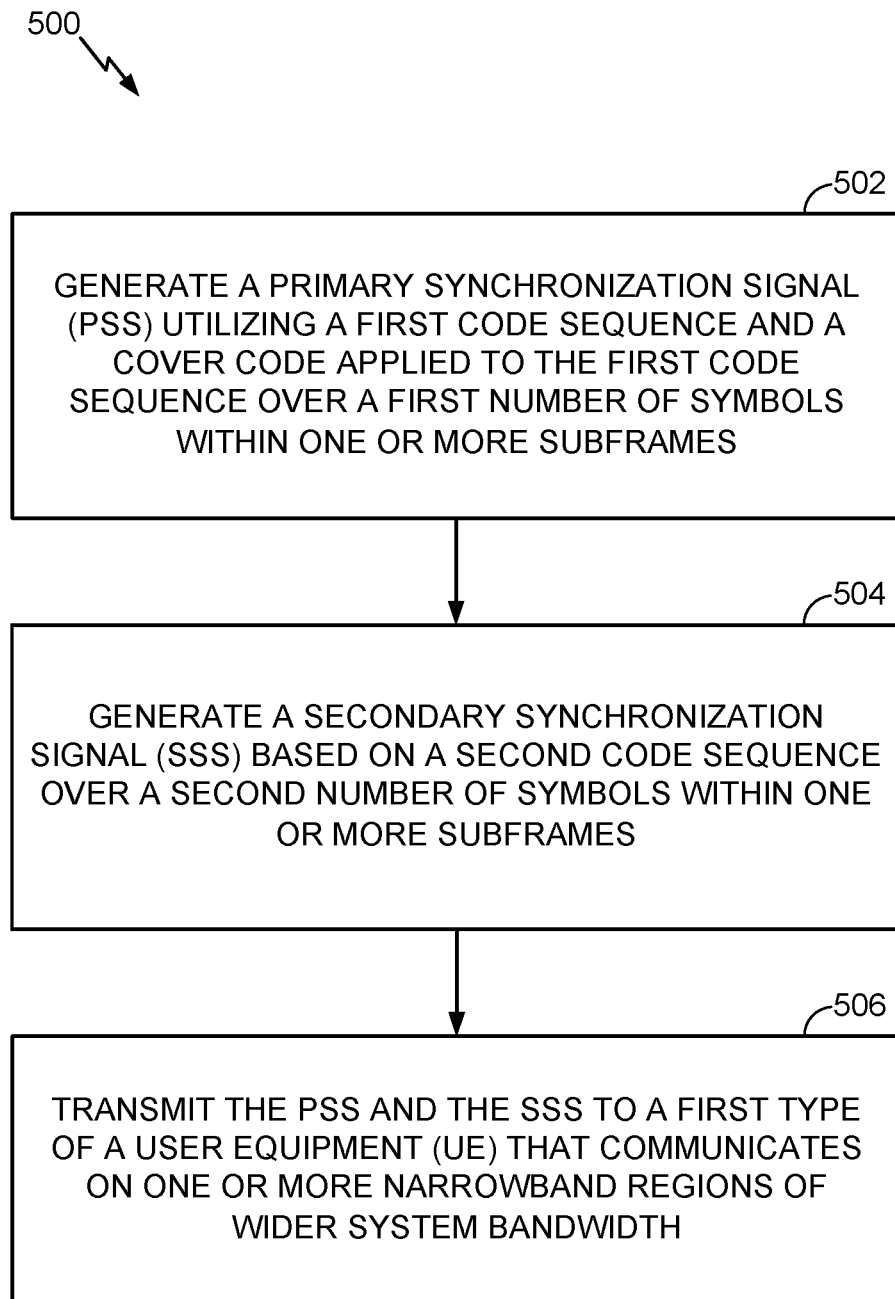
FIG. 5 illustrates example operations that may be performed by a base station (BS), in accordance with certain aspects of the present disclosure.

FIG. 5 illustrates example operations 500 that may be performed by a base station (BS) according to the synchronization signaling in accordance with aspects of the present disclosure.

The operations 500 begin, at 502, by generating a primary synchronization signal (PSS) utilizing a first code sequence and a cover code applied to the first code sequence over a first number of symbols within one or more subframes. At 504, the base station generates a secondary synchronization signal (SSS) based on a second code sequence over a second number of symbols within one or more subframes. These two operations (502 and 504) may correspond to the two-tiered approach to generating a PSS described above.

At 506, the base station transmits the PSS and the SSS in the first and second subframes to a first type of a user equipment (UE) that communicates on one or more narrow-band regions of wider system bandwidth. PSS and SSS may be transmitted in any suitable manner, for example, using non-overlapping resources. In some cases, PSS may be sent first and SSS later (e.g., using different symbols in the same subframe or in different subframes).

Figure 6:
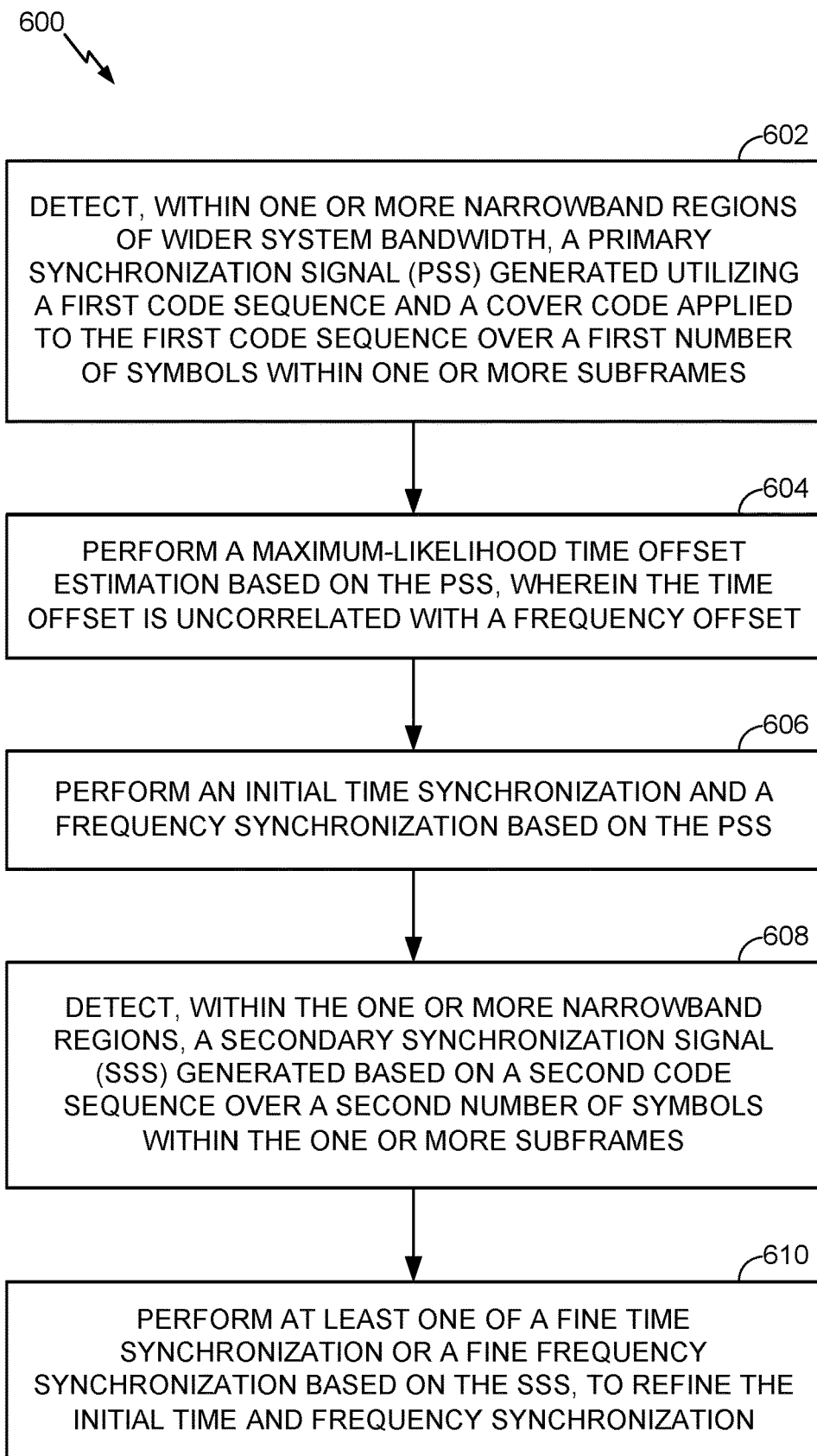
FIG. 6 illustrates example operations that may be performed by a user equipment (UE), in accordance with certain aspects of the present disclosure.

FIG. 6 illustrates example operations 600 that may be performed by a user equipment (UE), to detect PSS/SSS signaling in accordance with aspects presented herein. In other words, the operations may be performed to detect PSS/SSS signaling transmitted by a base station in accordance with the operations 500 of FIG. 5 described above.

The operations 600 begin, at 602, by detecting, within one or more narrowband regions of wider system bandwidth, a primary synchronization signal (PSS) generated utilizing a first code sequence and a cover code applied to the first code sequence over a first number of symbols within one or more subframes.

At 604, the UE performs a maximum likelihood time offset estimation based on the PSS, wherein the time offset is uncorrelated with a frequency offset. At 606, the UE performs an initial time synchronization and a frequency synchronization based on the PSS.

At 608, the UE detects, within the one or more narrow-band regions, a secondary synchronization signal (SSS) generated based on a second code sequence over a second number of symbols within the one or more subframes. At 610, the UE performs at least one of fine time synchronization or fine frequency synchronization based on the SSS, to refine the initial time and frequency synchronization.

Figure 7:
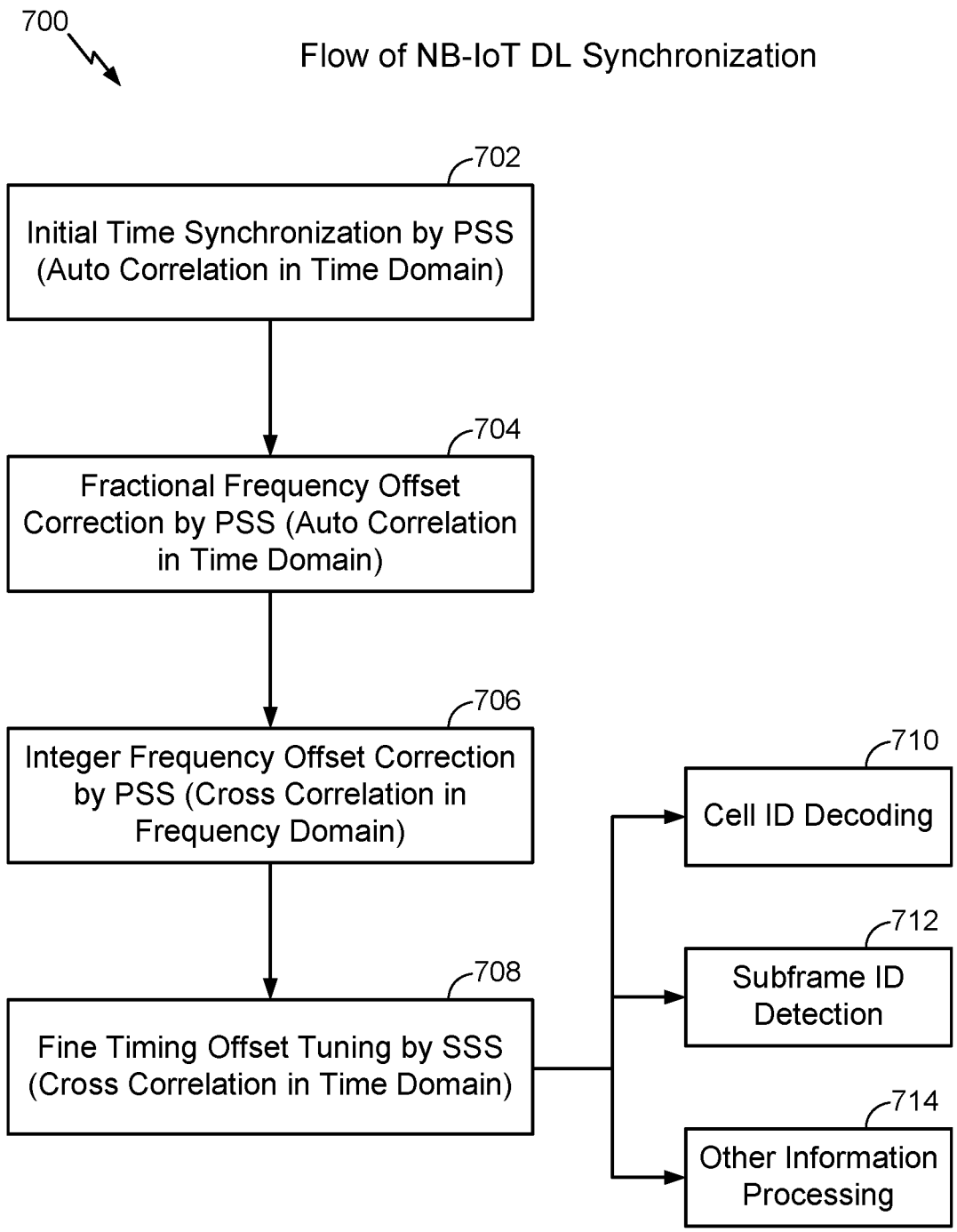
FIG. 7 illustrates a block diagram of example operations for narrowband internet-of-things (NB-IoT) synchronization, in accordance with certain aspects of the present disclosure.

FIG. 7 is a flow chart illustrates example operations 700 for NB-IoT synchronization, in accordance with certain aspects of the present disclosure. The operations shown in FIG. 7, for example, may represent more specific examples of the operations described above.

At 702, NB-IoT DL synchronization begins with initial time synchronization by PSS (auto correlation in the time domain). At 704, fractional frequency offset correction may be performed based on the PSS (auto correlation between co-phased and time synchronized symbols according to a pattern of the cover code, or multiple hypothesis based on frequency binning). At 706, the PSS may be used to perform integer frequency offset correction (e.g., based on cross correlation in frequency domain between the PSS and a local/delayed replica of the received signal).

At 708, fine timing offset tuning may be performed based on the SSS (cross correlation in time domain). As illustrated, the SSS may be used to decode not only cell ID 710, but also additional information, such as subframe ID 712, and/or other system information 714. In some cases, a pattern of a cover code may be selected to shape the ML estimation of the timing offset into a desired form.

According to certain aspects of the present disclosure, PSS can be designed with L orthogonal frequency-division multiplexing (OFDM) symbols, where L can be a configurable integer, and the L PSS symbols can be mapped to localized and/or distributed resource elements. In some cases, all L PSS symbols may be generated by only one Inverse Fast Fourier Transform (IFFT). As noted above, subcarrier spacing may be 15 KHz, and bandwidth may be 180 KHz. In some cases, the PSS may be generated according to a dual-layer sequence design scheme, using a "Base Code" (for Layer I) and a "Code Cover" (for Layer II).

According to certain aspects of the present disclosure, the constellation of "Base Code" can be Binary Phase Shift Keying (BPSK), or Quadrature Phase Shift Keying (QPSK), or punctured MPSK modulations with small alphabet size and relatively large Euclidean distance. The based code sequence is required to possess good auto-correlation properties in frequency domain, which enables reliable detection of integer frequency offset.

For example, a PSS "Base Code" may use computer generated sequence (CGS), modified Zadoff-Chu sequence, punctured Zadoff-Chu sequence, m-sequence, quadrature Walsh code, PN sequence or Barker code. A PSS sequence may be constructed by employing binary code cover on top of PSS base code to improve the accuracy of timing acquisition.

In other aspects of the present disclosure, the "Code Cover" may be a binary random code "cover" with asymmetrical run length (for 1's and −1's), and run lengths equal to or greater than two may be used to preserve phase continuity and provides expanded time window for oversized Fast Fourier Transform (FFT), which may improve frequency offset resolution. In one aspect, "Code Cover" polarity reverse asymmetry may help resolving timing ambiguity. In some cases, the code cover may include a Barker code, a Walsh code, or the like. Code cover optimization can be achieved by computer search for given PSS sequence length. In some cases, truncated versions of PSS sequences used in legacy systems (such as LTE) may also be used for NB-IoT PSS sequences.

Figure 8:
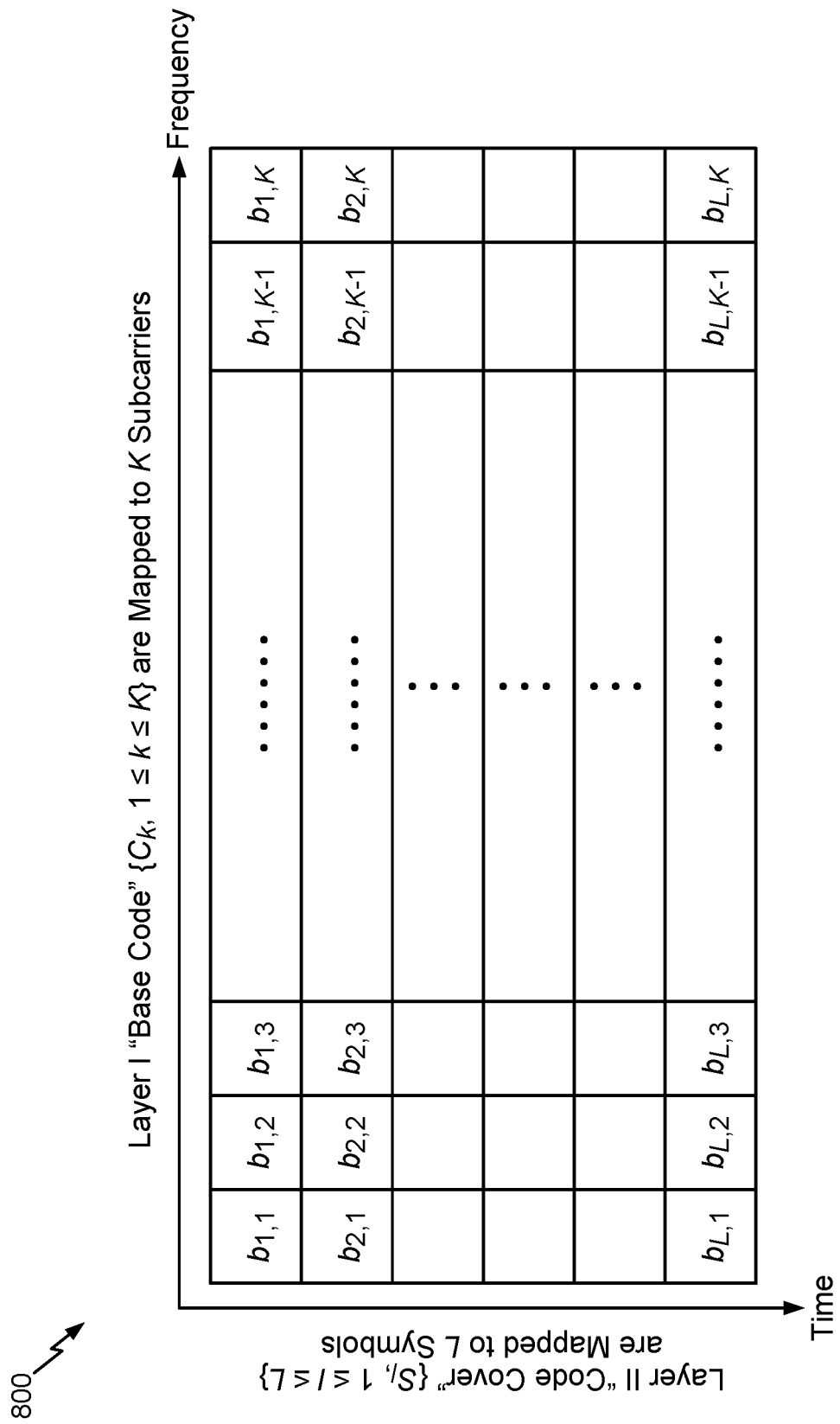
FIG. 8 illustrates an example of dual layer PSS sequence structure, in accordance with certain aspects of the present disclosure.

FIG. 8 illustrates an example of dual layer PSS sequence structure 800, in accordance with certain aspects of the present disclosure. As illustrated, the dual layer corresponds to mapping L×K localized or distributed resource elements within one LTE physical resource block (PRB), and that for in-band deployment, NB-IoT allocation can avoid the "reserved" REs of legacy LTE.

FIG. 9 illustrates an example of a modified Zadoff-Chu Sequences 900 with reduced alphabet size. The example shows that modified ZC sequences may be utilized to reduce phase and frequency errors and maintaining autocorrelation properties of Zadoff-Chu Sequence. The illustrated example shows that for K=12, base code of PSS sequence can be defined as $C(k)$, where $k=1, 2, \ldots, K$.

Figure 10:
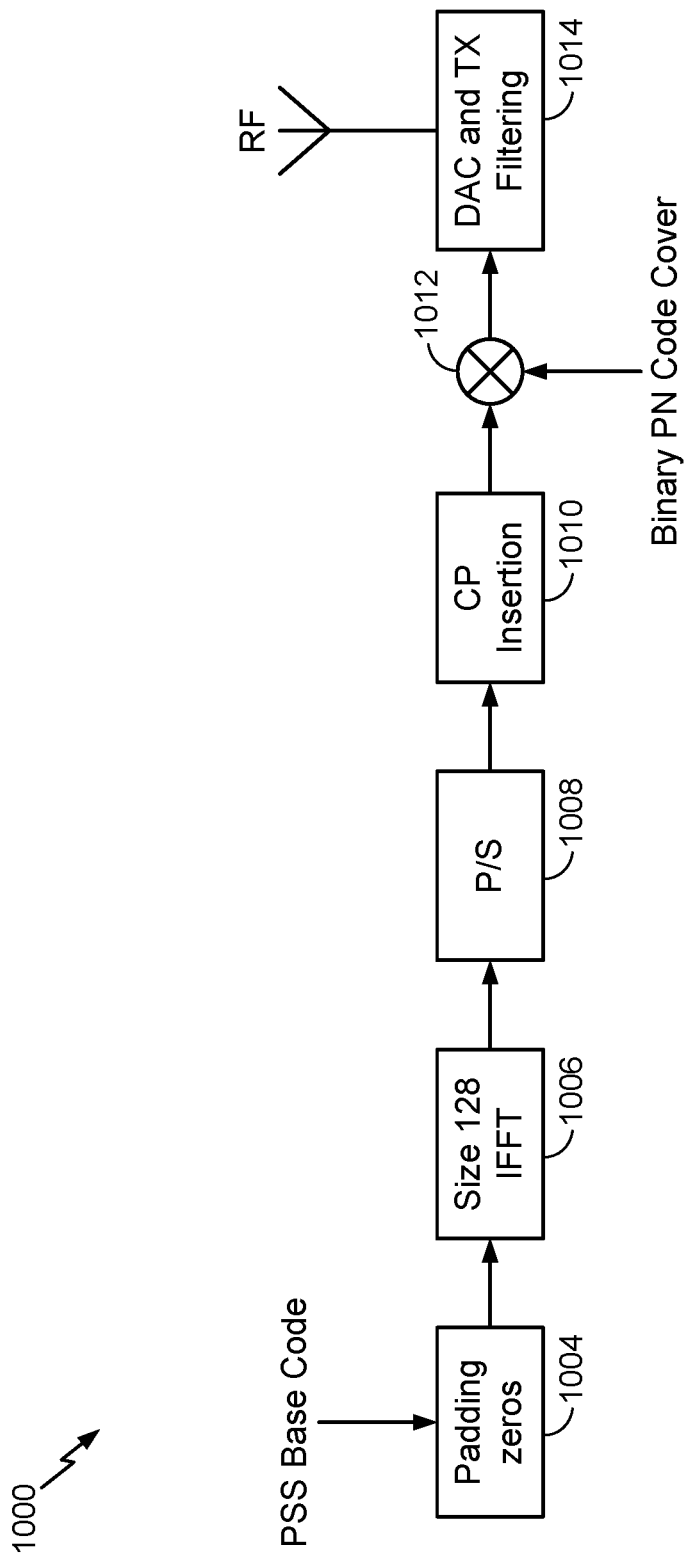
FIG. 10 illustrates a block diagram of example operations that may be performed by a base station to generate a PSS waveform, in accordance with certain aspects of the present disclosure.

FIG. 10 illustrates example logical blocks 1000 for generating a PSS waveform, according to aspects of the present disclosure. The blocks 1000 may be implemented in any suitable circuitry.

As illustrated, the blocks 1000 may include a block 1104 to pad a PSS Base Code with zero(s), which may be required to make length of the IFFT input into a value that is equal to the power of two. An inverse fast Fourier transform (IFFT) block 1006 may take the padded PSS base code and its output may undergo a parallel to serial conversion at block 1008. At block 1010, a cyclic prefix (CP) may be inserted and, at block 1012 a code cover may be applied (e.g., using a Binary Pseudo Noise (PN) Code Cover). At block 1014, the signal may be converted to analog signal through a digital to analog converter (DAC) and filtered, then transmitted.

In an example, in order to illustrate a single boundary NB-IoT fully aligned with legacy LTE, a 128 IFFT size may be chosen, sampling frequency (Fs) may be set at 1.92 MHz, and subcarrier spacing may be set at 15 KHz (although these parameters may vary). Symbol boundary alignment between the NB-IoT and the Legacy LTE may help prevent interference that may otherwise occur without the alignment. In certain aspects of the present disclosure, the PSS Base Code and Cover Code can be generated by the techniques mentioned in current application, and PSS symbols can occupy resource elements orthogonal to legacy LET allocation.

Figure 11:
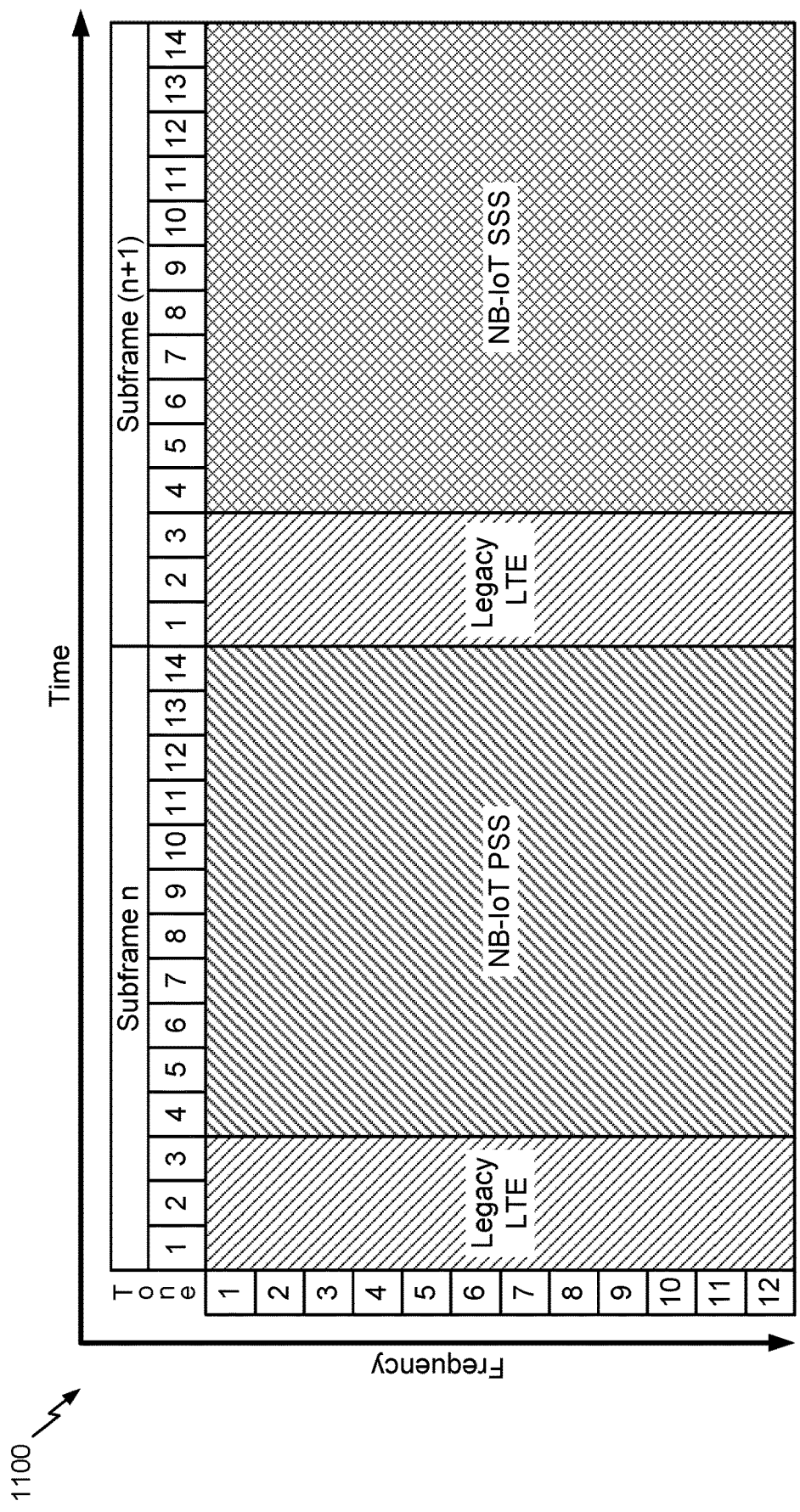
FIG. 11 is a plot of time-frequency resources illustrating collision-free resource mapping of NB-IoT and Legacy LTE, in accordance with certain aspects of the present disclosure.

FIG. 11 illustrates an example representation (resource map 1100) of collision-free resource mapping of NB-IoT and Legacy LTE, wherein the mapping may be suitable for both in-band and standalone deployment of NB-IoT. The example shows subframes n and n+1 in the time domain.

The example further shows subframe n may have NB-IoT PSS utilizing symbol elements that are unoccupied by Legacy LTE, and subframe n+1 may have NB-IoT SSS utilizing symbol elements that are unoccupied by Legacy LTE. The example also shows the NB-IoT synchronization signals (PSS/SSS of both in-band and standalone deployments) may be fully aligned with the Legacy LTE OFDM symbol boundary, and because the symbols may be fully aligned, no collision (conflict) and no interference occur between the NB-IoT and Legacy LTE. For more generalized case, the PSS sequence and SSS sequence may be time multiplexed in the same subframe without overlapping. Repetition of PSS sequence and SSS sequences across multiple subframes is also supported for coverage extension.

Figure 12:
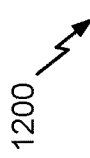
FIG. 12 illustrates an example timing offsets of maximum-likelihood estimation (MLE), in accordance with certain aspects of the present disclosure.

FIG. 12 illustrates an example table 1200 illustrating decoupled maximum-likelihood estimation (MLE) of timing offset as part of a time domain processing. As illustrated, PSS samples may be received with noise w, timing offset $\tau$, and frequency offset $v$.

$$r(n; \tau, v) = \sum_k b_{l,k} \exp\left(\frac{j\pi(k+v)}{64}(n-\tau)\right) + w(n)$$

$(l-1)N + lN_g < n \leq l(N+N_g), l \in \{1, 2, \ldots, L\}, 1 \leq k \leq K \leq 12$ Where N and $N_g$ denote the sample size of an OFDM symbol and its CP, respectively. The illustration further shows the boundary of PSS symbols may be a function of timing offset $\tau$; and for a given hypothesis on timing offset $\tau$, $\gamma_l$, the size 1 by N sub-vector of PSS samples corresponding to symbol i, may also be a function of timing offset $\tau$. Also as illustrated, a metric for decoupled timing offset estimation can be formed from normalized and coherently combined sub-vectors of PSS samples; and the metric is independent from frequency offset, which serves as a cost function for the timing offset (e.g., to reduce sensitivity to SNR) and can be expressed by:

$$\lambda(\tau) \triangleq \sum_{D=1}^{(L-1)} \left| \sum_{l=1}^{L-D} s(l)s(l+D)\gamma_l \gamma_{l+D}^H \right|$$

Where D stands for the symbol distance between two sub-vectors whose phase difference is proportional to DNv, and the product of s(l)s(l+D) is employed to enforce coherent combining for co-phased terms whose phase is proportional to DNv. In some cases, a range of the combining spans across multiple subframes. In some cases, a lag size of the delayed samples may be a configurable parameter based on PSS time domain resource allocation. The illustration shows the Maximum-Likelihood Estimate (MLE) of timing offset is decoupled from the frequency offset $v$. Therefore, the timing offset estimation may be obtained by $\hat{\tau} = \text{argmax}_\tau \lambda(\tau)$. In one aspect of the present disclosure, MLE of fractional frequency may be derived based on, at least partly, the decoupled MLE of timing offset.

Alternatively, MLE of fractional frequency offset may be based on, at least partly, the MLE of timing offset from FIG. 12. In one example where the normalized frequency offset may be 1.2. As illustrated, normalized carrier frequency offset (CFO) can be split into a fractional part and an integer part:

$v = v_F + v_I$, where $v_I \in \mathbb{Z}$ and $-0.5 \leq v_F \leq 0.5$

As illustrated in the above equation, $v$ represents the normalized carrier frequency offset (CFO), $v_F$ represents the fractional part of the normalized CFO, and $v_I$ represents the integer part of the normalized CFO. Thus, estimation of frequency offset may be separated into two parts: fractional frequency offset estimation (the 0.2 of the 1.2 normalized frequency offset, or $v_F = 0.2$), and integer frequency offset estimation (the 1 of the 1.2 normalized frequency offset, or $v_I = 1$).

As illustrated, samples of the second symbol of the PSS symbol pairs $\{\gamma_2, \gamma_3\}$ and $\{\gamma_4, \gamma_5\}$, differ from their predecessors by a constant phase shift that is proportional to the fractional part of CFO. Therefore, assume $\gamma_l \triangleq [r(l, 1)\ r(l, 2)\ r(l, 3)\ \ldots\ r(l, N)]$, then $\gamma_{l+1} =$ $e^{j2\pi v} \times \gamma_l = e^{j2\pi v_F}[r(l, 1)\ r(l, 2)\ r(l, 3)\ \ldots\ r(l, N)] \Rightarrow \widehat{v_F}(l) =$ $\frac{1}{2\pi}\arg(\gamma_{l+1}\gamma_l^H) = \frac{1}{2\pi N}\sum_{n=1}^{N} \arg\{s(l)s(l+1)r(l+1, n)r^*(l+n)\}, l = 2, 4$ In one embodiment, samples of symbol $\gamma_3$ differ from samples of $\gamma_2$ by a constant phase shift proportional to the fractional part of CFO ($j2\pi v_F$ represents a constant phase rotation proportional only to $v_F$). In some cases, for different PSS symbols, $\widehat{v_F}(l)$ can be averaged to obtain a smoother estimate.

In one aspect of the present disclosure, integer part of the normalized CFO, $v_I$, may be estimated by cross correlation of received and transmitted PSS pilots in the frequency domain because $v_I$ leads to shifts in the PSS pilots in the frequency domain from the pilots' original locations.

Figure 13:
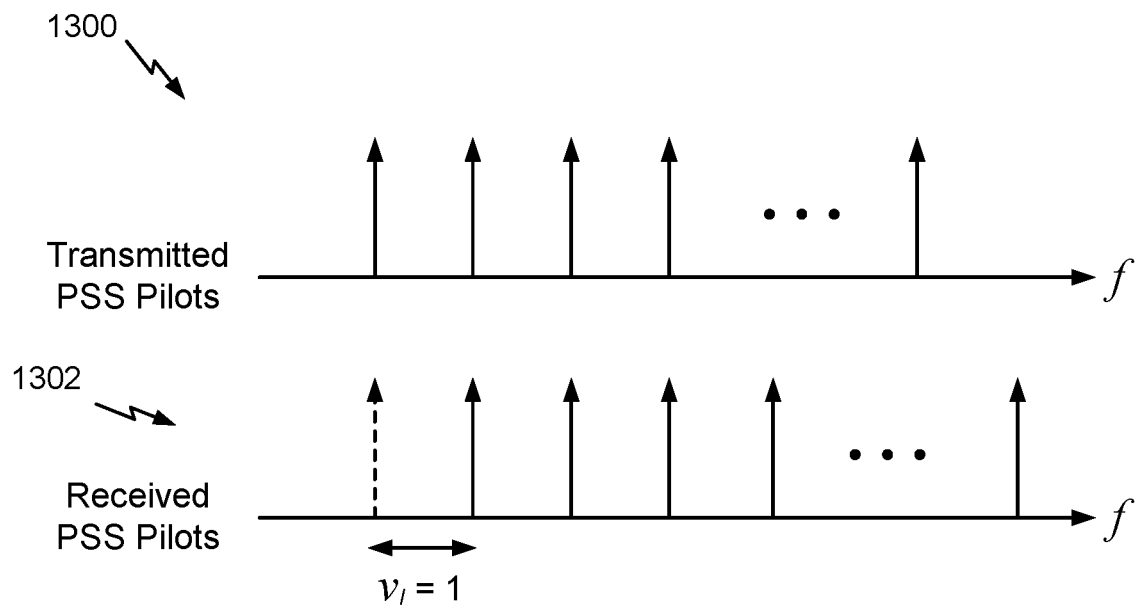
FIG. 13 illustrates frequency locations of transmitted and received PSS pilots, in accordance with certain aspects of the present disclosure.
Figure 13A:
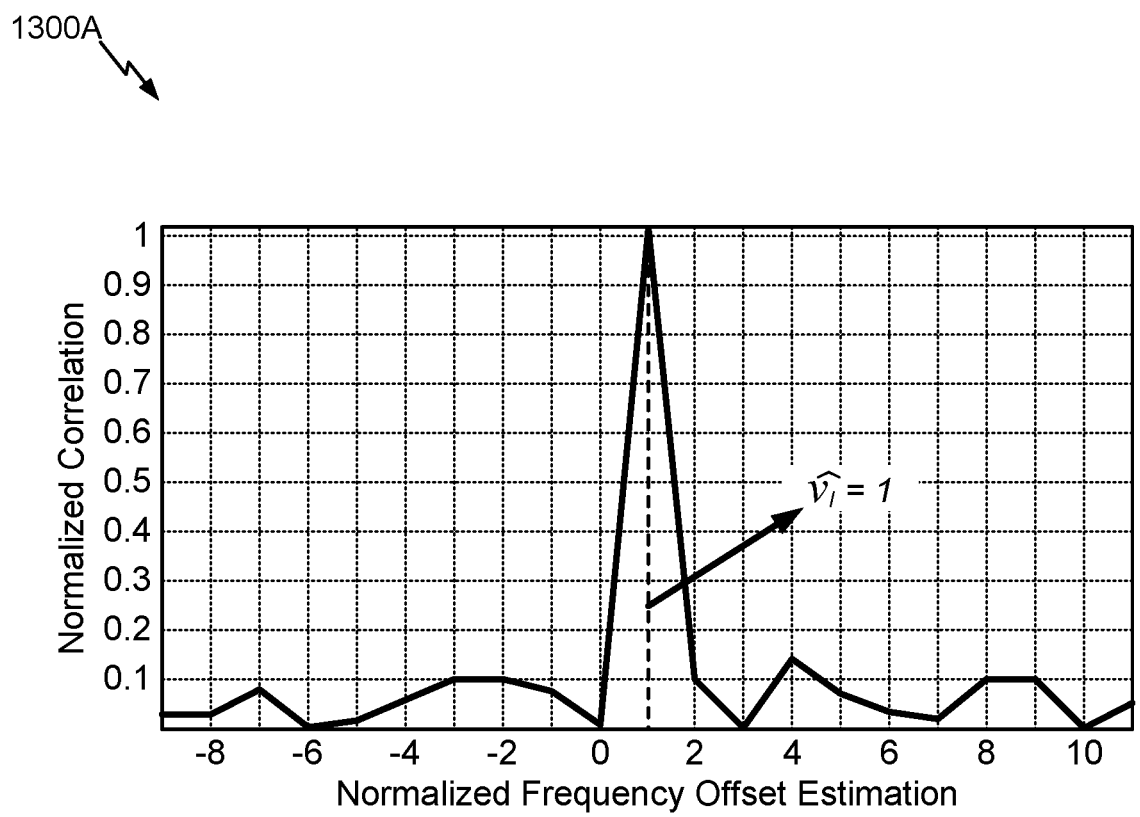
FIG. 13A is a graph illustrating normalized frequency offset estimation based on normalized correlation, in accordance with certain aspects of the present disclosure.

As illustrated in plots 1302 and 1304 of FIGS. 13 and 13A, the original locations of the PSS pilots transmitted may be shifted by $v_I$ in the frequency domain, and the shifted locations may be reflected in the PSS pilots received. In this illustration, the peak location of the normalized correlation where $\hat{v}_I = 1$ correlates to the normalized integer frequency offset estimate.

In certain aspects of the present disclosure, boundaries of discrete Fourier transform (DFT) window can be established with the MLE timing offset, and leakage from side lobes of fractional CFO can be minimized after correction of the fractional offset of the CFO, and the reliability of integer CFO MLE can be obtained through averaging multiple observations of the cross-correlation. As illustrated in plot 1300A of FIG. 13A, an implementation of timing and frequency acquisition for an in-band NB-IoT PSS through time domain processing and frequency domain processing.

In one aspect of the present disclosure, NB-IoT SSS can be designed with M OFDM symbols, where M can be a configurable integer (e.g., greater than or equal to six), and the M SSS symbols can be mapped to localized and/or distributed resource elements. In another aspect of the present disclosure, subcarrier spacing for BN-IoT SSS can be 15 KHz, and bandwidth may be 180 KHz. In some cases, the SSS sequence design can be generated by a Length-K Zadoff-Chu sequence with root u(m) for m-th SSS symbol where root $u(m) \in \{1, 2, \ldots, K\}$ and $gcd(u(m), K)=1$, and computer generated sequence (CGS) or modified Zadoff-Chu sequences may be used for SSS sequence. Yet, in another aspect of the present disclosure, truncated LTE SSS sequences can be used for NB-IoT SSS sequences. In certain aspects of the present disclosure, cell ID mapping may be accomplished by one-to-one mapping from decimal to M-element array. As illustrated, the number of roots can be equivalent to the number of potential candidates for NB-IoT SSS symbol location, and NB-IoT SSS can carry 13-bit, or more, of information for cell ID, subframe ID, and other system information.

Figure 14:
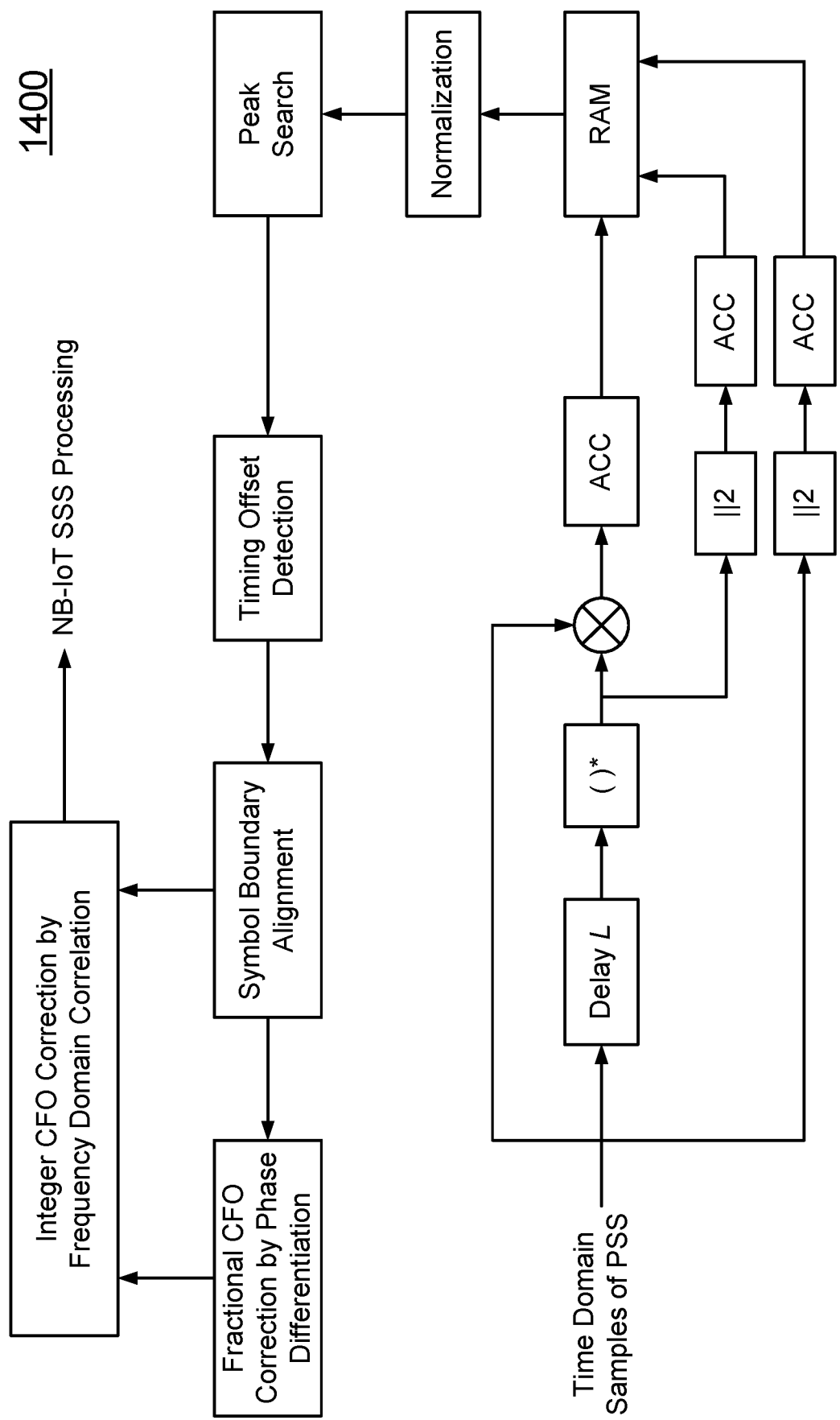
FIG. 14 illustrates a block diagram of example operations for timing and frequency acquisition, in accordance with certain aspects of the present disclosure.

FIG. 14 illustrates an example block diagram 1400 for PSS/SSS processing for timing and frequency synchronization, in accordance with certain aspects of the present disclosure. As illustrated, after taking time domain samples of PSS, correlation operations may be performed (e.g., via normalizing and performing a peak search) for timing offset detection, symbol boundary alignment and fractional CFO correction (e.g., by phase differentiation). The results may be used to perform integer CFO correction (e.g., by frequency domain correlation) and the corresponding output used for SSS processing.

Figure 15:
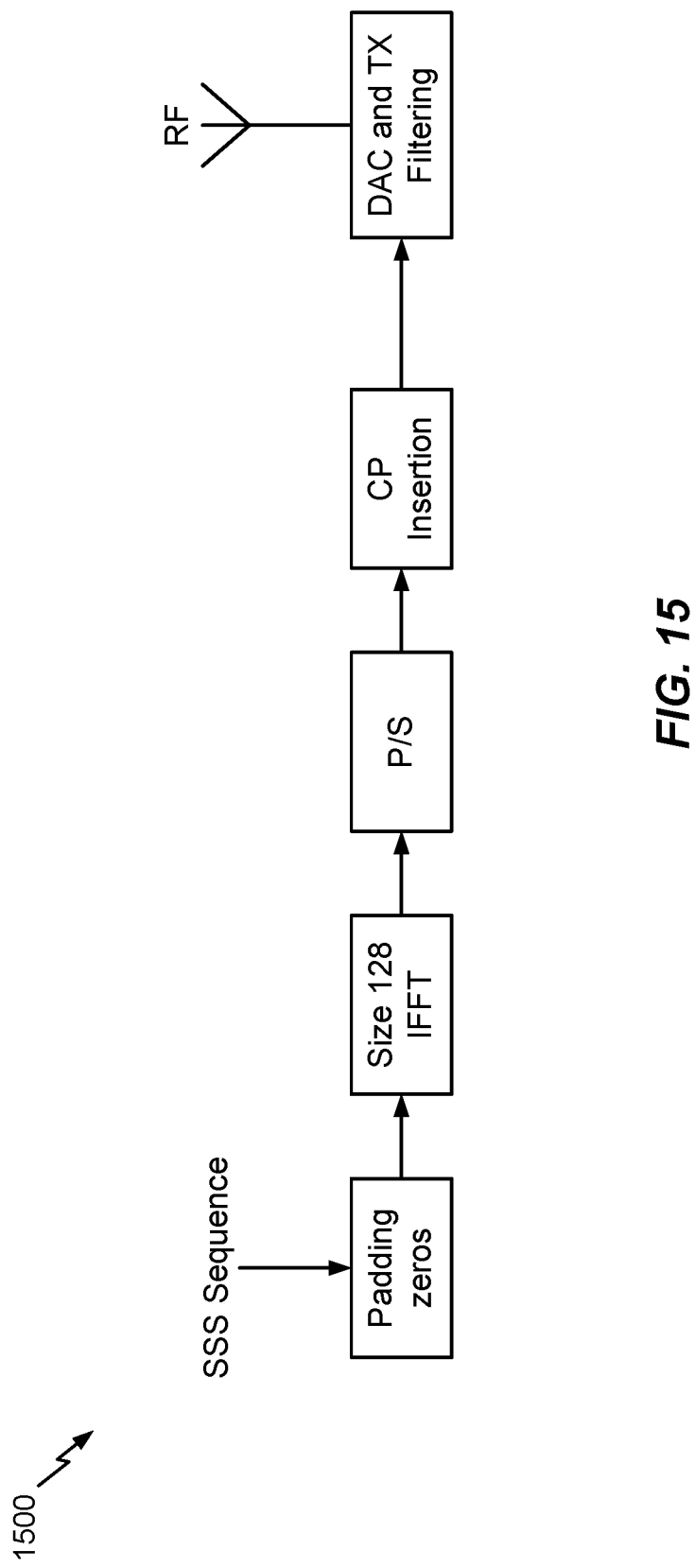
FIG. 15 illustrates example operations that may be performed by a base station to generate a SSS waveform, in accordance with certain aspects of the present disclosure.

FIG. 15 illustrates an example block diagram 1500 for generating an SSS waveform, according to aspects of the present disclosure. As illustrated, NB-IoT SSS waveform generation process can be different than NB-IoT PSS waveform generation process (e.g., in that there may be no Code Cover applied).

As illustrated, an SSS sequence may be padded with zeroes, followed by an IFFT, parallel to serial conversion followed by cyclic prefix (CP) insertion. In the example, to illustrate a single boundary NB-IoT fully aligned with legacy LTE, a 128 IFFT size was chosen, the sampling frequency (Fs) may be set at 1.92 MHz (may vary in other instances), and subcarrier spacing may be set at 15 KHz (may vary in other instances). The boundary alignment between the NB-IoT and the Legacy LTE prevents interference that may otherwise occur without the alignment.

The example also shows the SSS sequence can be converted to analog signal through a digital to analog converter (DAC), and the signal is filtered and transmitted (TX). In certain aspects of the present disclosure, the SSS sequence can be generated by the techniques mentioned in current application, and SSS symbols can occupy resource elements (REs) orthogonal to REs per legacy LTE allocation.

Figure 16:
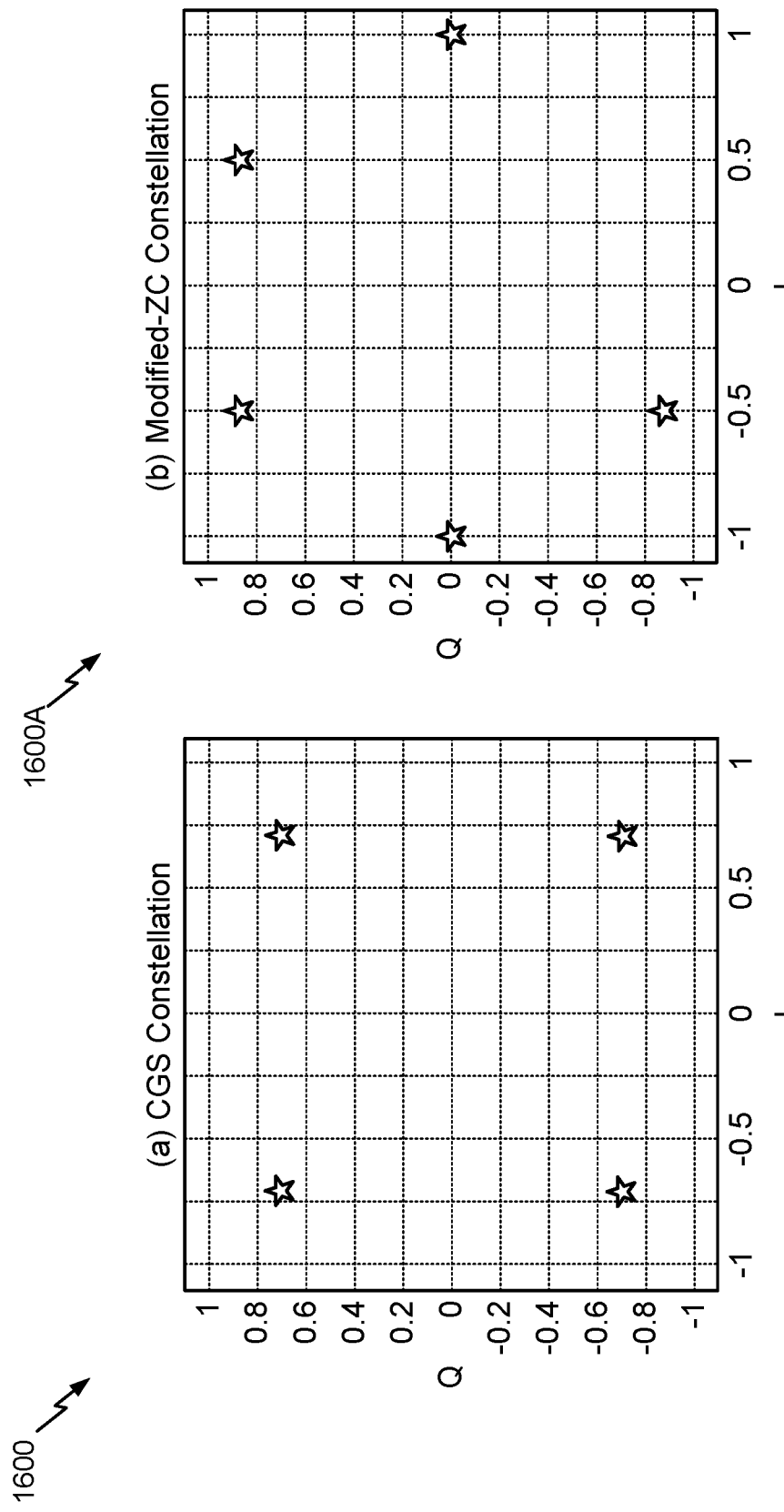
FIG. 16 is a graph illustrating the constellation of PSS sequence corresponding to a computer generated sequence of length, in accordance with certain aspects of the present disclosure.

FIG. 16 illustrates a graphical example of PSS sequence constellation 1600 corresponding to computer generated sequence (CGS) of length 12. The constellation of "Base Code" can be Binary Phase Shift Keying (BPSK), or Quadrature Phase Shift Keying (QPSK), or punctured MPSK modulations with small alphabet size and relatively large Euclidean distance. The based code sequence may possess suitable auto-correlation properties in frequency domain, which enables reliable detection of integer frequency offset. For example, PSS "Base Code" may use computer generated sequence (CGS), modified Zadoff-Chu sequence, punctured Zadoff-Chu sequence, m-sequence, quadrature Walsh code, PN sequence or Barker code. CGS may have similarly suitable auto-correlation properties in the time domain as a length-K Zadoff-Chu (ZC) sequence and may be constructed using a reduced-size alphabet with enlarged Euclidean distance. In one aspect of the present disclosure, when K=12, CGS is QPSK.

Figure 17:
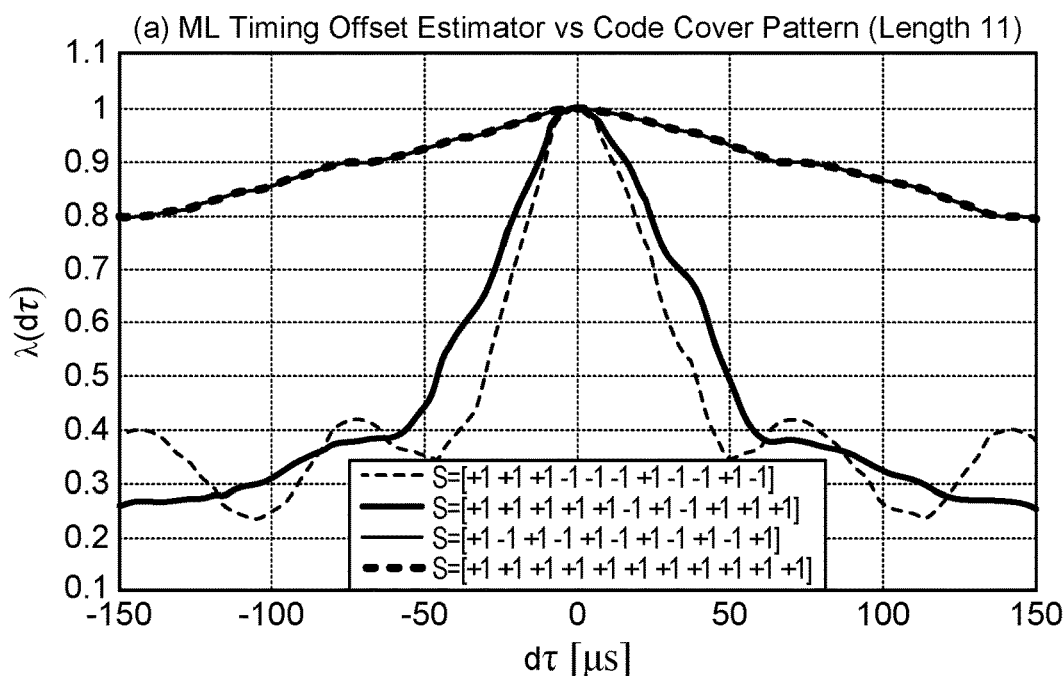
FIG. 17 is a graph of timing estimation and timing metric showing the impacts of cover code optimization on timing offset estimation, in accordance with certain aspects of the present disclosure.

FIG. 16A illustrates a graphical example of PSS sequence constellation 1600A corresponding to modified Zadoff-Chu (ZC) sequence of length 12. ZC sequence may have similarly suitable auto-correlation properties in the time domain as a CGS. Modified ZC sequence may be a set of chirp-like polyphase sequences with a minimum number of alphabets. In one aspect of the present disclosure, when K=12, modified ZC sequence may uses only five out of six constellation points of 6-PSK, and the constellation may be generated by puncturing a 6-PSK constellation. Plot 1700 of FIG. 17 illustrates an example of impacts of cover code optimization on timing offset estimation. The example further shows the dependence of timing offset estimator on the choice of binary cover code patterns when PSS sequence duration equals 11 symbols.

Figure 17A:
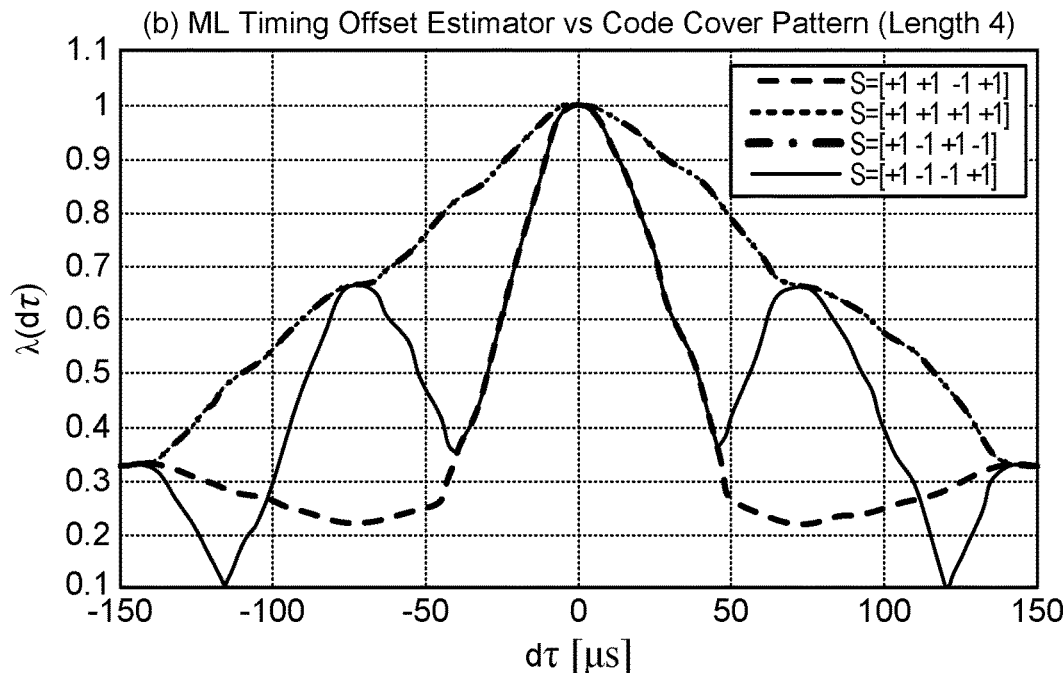
FIG. 17A is a graph of timing estimation and timing metric showing the dependence of timing offset estimator on the choice of binary cover code patterns, in accordance with certain aspects of the present disclosure.

Plot 1700A of FIG. 17A illustrates an example of dependence of timing offset estimator on the choice of binary cover code patterns when PSS sequence duration equals 4 symbols.

Figure 18:
FIG. 18 is a table showing the mapping from SSS sequence to cell ID and system information, in accordance with certain aspects of the present disclosure.

FIG. 18 illustrates an example of mapping from SSS sequence to cell ID, subframe number, and other system information. The example shows each SSS sequence may comprises a set of M SSS symbols, and the m-th symbol of the k-th SSS sequence can be constructed by a root μ(k, m) Zadoff-Chu sequence. In one aspect of the present disclosure, the k-th SSS sequence can be uniquely identified by its roots arrangement.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
generating a primary synchronization signal (PSS) utilizing a first code sequence and a cover code applied to the first code sequence over a first number of symbols within one or more subframes, wherein the cover code comprises a binary sequence; and
transmitting the PSS to a first type of a user equipment (UE) that communicates on one or more narrowband carrier regions, wherein the one or more narrowband carrier regions is within a guard-band of a wider carrier bandwidth.

2. The method of claim 1, wherein the one or more narrowband carrier regions is relative to the wider carrier bandwidth.

3. The method of claim 1, wherein the binary sequence is a computer generated binary sequence.

4. The method of claim 1, further comprising:
generating a secondary synchronization signal (SSS) based on a second code sequence over a second number of symbols within one or more subframes; and
transmitting the SSS to the first type of the UE.

5. The method of claim 4, wherein PSS and SSS are transmitted using non-overlapping resources.

6. The method of claim 5, wherein PSS and SSS are transmitted in separate subframes.

7. The method of claim 4, wherein the first number of symbols are mapped to resource elements that have a same subcarrier spacing as resource elements used to communicate with a second type of UE that communicates on the wider carrier bandwidth.

8. The method of claim 7, wherein the PSS and SSS are transmitted using resource elements not used for communicating with the second type of UE.

9. The method of claim 4, wherein:
the first number of symbols are within a first subframe; and
the second number of symbols are within a second subframe.

10. The method claim 9, wherein transmitting the PSS and SSS comprises time multiplexing the PSS and SSS sequences within at least one of the first and second subframes, and wherein the PSS and SSS occupy different orthogonal frequency division multiplexing (OFDM) symbol locations with at least one subframe.

11. The method of claim 1, wherein the first code sequence is generated using at least one of a computer generated sequence (CGS), a modified Zadoff-Chu sequence with a reduced alphabet, a Walsh code, a Barker code, or a truncated Zadoff-Chu sequence.

12. The method of claim 4, wherein the second code sequence comprises a Zadoff-Chu sequence, a truncated Zadoff-Chu sequence, or a computer generated polyphase sequence.

13. The method of claim 4, wherein the SSS is used to convey a cell identification (cell ID) and additional system information.

14. The method of claim 13, wherein the additional system information comprises at least a subframe ID.

15. A method for wireless communications by a first type of user equipment (UE), comprising:
detecting, within one or more narrowband carrier regions, a primary synchronization signal (PSS) generated utilizing a first code sequence and a cover code applied to the first code sequence over a first number of symbols within one or more subframes, wherein the cover code comprises a binary sequence, wherein the one or more narrowband carrier regions is within a guard-band of a wider carrier bandwidth; and
performing time synchronization and a frequency synchronization based on the PSS.

16. The method of claim 5, wherein the one or more narrowband carrier regions is relative to the wider carrier bandwidth.

17. The method of claim 5, wherein the binary sequence is a computer generated binary sequence.

18. The method of claim 5, further comprising:
performing a maximum-likelihood time offset estimation based on the PSS, wherein the time offset is uncorrelated with a frequency offset;
detecting, within the one or more narrowband carrier regions, a secondary synchronization signal (SSS) generated based on a second code sequence over a second number of symbols within the one or more subframes; and
performing at least one of fine time synchronization or fine frequency synchronization based on the SSS, to refine the time and frequency synchronization.

19. The method of claim 18, wherein PSS and SSS are detected in non-overlapping resources.

20. The method of claim 19, wherein PSS and SSS are detected in separate subframes.

21. The method of claim 5, wherein performing the frequency synchronization comprises:
performing a fractional frequency offset correction, from the PSS, based on autocorrelation in time domain of the time synchronized PSS or based on multiple hypothesis testing and frequency binning; and
performing an integer frequency offset correction, from the PSS, based on cross correlation in frequency domain between the PSS and a local replica of the received signal.

22. The method of claim 18, wherein performing the fine timing synchronization comprises performing cross correlation in time domain on the SSS.

23. The method of claim 18, wherein the first number of symbols are mapped to resource elements that have a same subcarrier spacing as resource elements used to communicate with a second type of UE that communicates on the wider carrier bandwidth.

24. The method of claim 23, wherein the PSS and SSS are transmitted using resource elements not used for communicating with the second type of UE.

25. The method of claim 18, wherein:
the first number of symbols are within a first subframe; and
the second number of symbols are within a second subframe.

26. The method of claim 5, wherein the first code sequence is generated using at least one of a generated sequence (CGS), a modified Zadoff-Chu sequence with a reduced alphabet, a Walsh code, a Barker code, or a truncated Zadoff-Chu sequence.

27. The method of claim 18, wherein the second code sequence comprises a Zadoff-Chu sequence, a computer generated polyphase sequence, or a truncated Zadoff-Chu sequence.

28. The method of claim 18, further comprising determining, from the SSS, a cell identification (cell ID) and additional system information.

29. The method of claim 28, wherein the additional system information comprises at least a subframe ID.

30. The method of claim 18, wherein performing the fine time synchronization comprises:
performing a timing offset correction based on a maximum likelihood (ML) estimation by coherently combining all co-phased symbol pairs according to a pattern of the cover code, wherein a range of the combining spans across the one or more subframes; and
normalizing a cost function by a power of the PSS sequence to reduce sensitivity to signal to noise ratio (SNR) levels.

31. The method of claim 30, wherein the combining of the co-phased symbol pairs comprises performing autocorrelation between delayed samples of the PSS, wherein a lag size of the delayed samples is a configurable parameter based on PSS time domain resource allocation.

32. The method of claim 30, wherein a pattern of the cover code is selected to shape the ML estimation of the timing offset into a desired form.

33. An apparatus for wireless communications, comprising:
at least one processor configured to generate a primary synchronization signal (PSS) utilizing a first code sequence and a cover code applied to the first code sequence over a first number of symbols within one or more subframes, wherein the cover code comprises a computer generated binary sequence; and
a transmitter configured to transmit the PSS to a first type of a user equipment (UE) that communicates on one or more narrowband carrier regions, wherein the one or more narrowband carrier regions is within a guard-band of a wider carrier bandwidth.

34. An apparatus for wireless communications, comprising:
- at least one processor configured to detect, within one or more narrowband carrier regions, a primary synchronization signal (PSS) generated utilizing a first code sequence and a cover code applied to the first code sequence over a first number of symbols within one or more subframes, wherein the cover code comprises a computer generated binary sequence, and perform time synchronization and a frequency synchronization based on the PSS, wherein the one or more narrowband carrier regions is within a guard-band of a wider carrier bandwidth; and
- a memory coupled with the at least one processor.

* * * * *